US012001992B2

(12) United States Patent
Borgerson et al.

(10) Patent No.: US 12,001,992 B2
(45) Date of Patent: Jun. 4, 2024

(54) SYSTEM AND METHOD FOR GENERATING COMMODITY FLOW INFORMATION

(71) Applicant: Cargometrics Technologies, LLC, Boston, MA (US)

(72) Inventors: Scott G. Borgerson, Boston, MA (US); James E. Scully, Natick, MA (US); Ethan E. Rowe, Needham, MA (US); Robert A. Weisenseel, Arlington, MA (US); Ronnie Hoogerwerf, Lexington, MA (US)

(73) Assignee: CARGOMETRICS TECHNOLOGIES, LLC, Boston, MA (US)

( * ) Notice: Subject to any disclaimer, the term of this patent is extended or adjusted under 35 U.S.C. 154(b) by 582 days.

(21) Appl. No.: 17/208,420

(22) Filed: Mar. 22, 2021

(65) Prior Publication Data
US 2021/0209547 A1    Jul. 8, 2021

Related U.S. Application Data

(63) Continuation of application No. 16/562,634, filed on Sep. 6, 2019, now Pat. No. 10,956,852, which is a
(Continued)

(51) Int. Cl.
G08G 1/00 (2006.01)
G01C 21/20 (2006.01)
(Continued)

(52) U.S. Cl.
CPC ....... G06Q 10/0831 (2013.01); G01C 21/203 (2013.01); G06F 16/904 (2019.01);
(Continued)

(58) Field of Classification Search
CPC .................. G06Q 10/02; G08G 1/00
See application file for complete search history.

(56) References Cited

U.S. PATENT DOCUMENTS 8,275,508 B1 * 9/2012 Adams ............... G07C 5/008
715/810
8,370,054 B2 * 2/2013 Crady ............... G05D 1/0287
701/453

(Continued)

OTHER PUBLICATIONS

Greidanus H Ed-Barale V et al., "Remote Sensing of the European Seas, Satellite Imaging for Maritime Surveillance of the European Seas", Mar. 31, 2008, Remote Sensing of the European Seas, Springer Science + Business Media B.V., Dordrecht, NL, pp. 343-358, XP002514546, ISBN: 978-1-4020-6772-3.

Primary Examiner — Tan Q Nguyen

(57) ABSTRACT

Disclosed is method including receiving digital vehicle data for a fleet of vehicles like trucks, trains, planes, drones, etc., the digital vehicle data being one or more of GPS/location-based data, image data or radar data and combining one or more of pieces of data. The method includes inferring, based on the first combined data or based on incomplete data, a loaded/empty status of a vehicle. The method includes combining other data to yield second combined data, receiving data regarding one or more of supply, demand, and amount of available cargo to yield third combined data, generating information relating to a supply of vehicles available to load at a specified dock and/or deliver a cargo to a specified dock, in each case within a specified period of time and generating suggestions for one or more vehicles regarding future routes based on the data.

20 Claims, 15 Drawing Sheets

Related U.S. Application Data continuation of application No. 16/188,354, filed on Nov. 13, 2018, now Pat. No. 10,410,167, which is a continuation of application No. 15/790,952, filed on Oct. 23, 2017, now Pat. No. 10,127,515, which is a continuation-in-part of application No. 15/200,774, filed on Jul. 1, 2016, now Pat. No. 9,798,996, which is a continuation of application No. 12/997,295, filed as application No. PCT/US2009/048545 on Jun. 25, 2009, now Pat. No. 9,384,456.

(60) Provisional application No. 61/162,008, filed on Mar. 20, 2009, provisional application No. 61/159,854, filed on Mar. 13, 2009, provisional application No. 61/120,136, filed on Dec. 5, 2008, provisional application No. 61/076,317, filed on Jun. 27, 2008.

(51) Int. Cl.

| | | |
|---|---|---|
| *G06F 16/904* | (2019.01) | |
| *G06Q 10/047* | (2023.01) | |
| *G06Q 10/08* | (2023.01) | |
| *G06Q 10/0831* | (2023.01) | |
| *G06Q 10/0832* | (2023.01) | |
| *G06Q 10/0833* | (2023.01) | |
| *G06Q 40/04* | (2012.01) | |
| *G06Q 50/40* | (2024.01) | |
| *B61L 15/00* | (2006.01) | |
| *B61L 27/16* | (2022.01) | |
| *B61L 27/40* | (2022.01) | |
| *B63B 25/28* | (2006.01) | |

(52) U.S. Cl.
CPC ........... *G06Q 10/047* (2013.01); *G06Q 10/08* (2013.01); *G06Q 10/0832* (2013.01); *G06Q 10/0833* (2013.01); *G06Q 40/04* (2013.01); *G06Q 50/40* (2024.01); *B61L 15/0058* (2024.01); *B61L 27/16* (2022.01); *B61L 27/40* (2022.01); *B63B 25/28* (2013.01)

(56) References Cited

U.S. PATENT DOCUMENTS

| | | |
|---|---|---|
| 2004/0230601 A1 | 11/2004 | Joao |
| 2006/0058941 A1 | 3/2006 | DeKock et al. |
| 2007/0008135 A1 | 1/2007 | Sajkowsky |
| 2008/0088485 A1 | 4/2008 | Stolte et al. |
| 2008/0094250 A1 | 4/2008 | Myr |
| 2009/0192864 A1 | 7/2009 | Song |
| 2010/0287073 A1* | 11/2010 | Kocis ................... G06Q 10/047 705/28 |
| 2012/0226391 A1* | 9/2012 | Fryer ................. G01C 21/3407 701/1 |

* cited by examiner

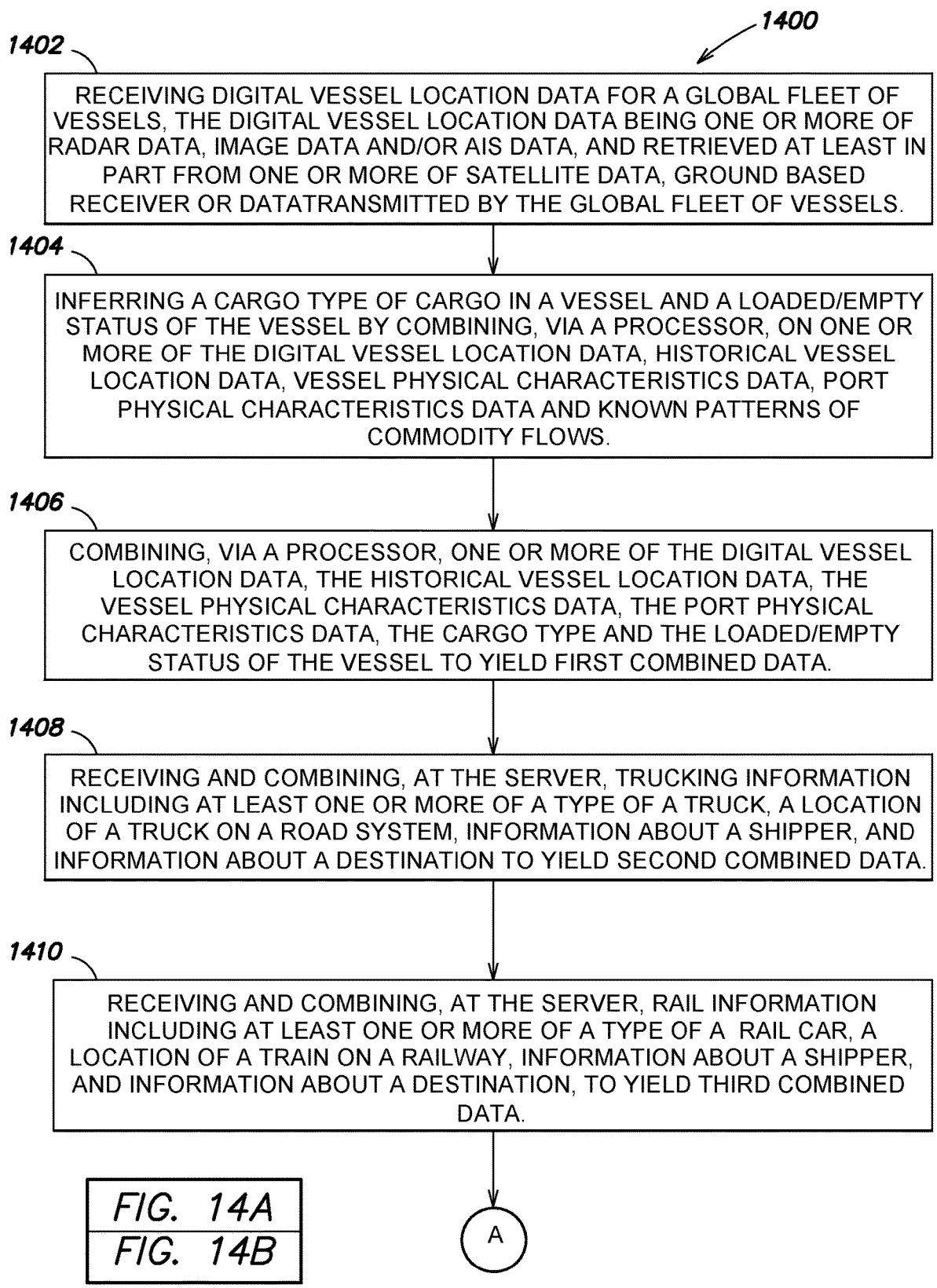

SYSTEM AND METHOD FOR GENERATING COMMODITY FLOW INFORMATION

PRIORITY CLAIM

This application is a continuation of U.S. patent application Ser. No. 16/562,634, filed Sep. 6, 2019, filed Sep. 6, 2019, which is a continuation of U.S. patent application Ser. No. 16/188,354, filed Nov. 13, 2018, now U.S. Pat. No. 10,410,167, issued Sep. 10, 2019, which is a continuation of Ser. No. 15/790,952, filed Oct. 23, 2017, now U.S. Pat. No. 10,127,515, issued Nov. 13, 2018, which is a continuation-in-part of U.S. patent application Ser. No. 15/200,774, filed Jul. 1, 2016, now U.S. Pat. No. 9,798,996, issued Oct. 24, 2017, which is a continuation of U.S. patent application Ser. No. 12/997,295, filed May 27, 2011, now U.S. Pat. No. 9,384,456, issued Jul. 5, 2016, which is a national phase of PCT/US2009/048545, filed Jun. 25, 2009, which claims priority to U.S. Provisional Application Nos. 61/076,317, filed Jun. 27, 2008, 61/120,136, filed Dec. 5, 2008, 61/159,854, filed Mar. 13, 2009, and 61/162,008, filed Mar. 20, 2009, the contents of which are incorporated herein by reference in their entirety.

FIELD OF THE DISCLOSURE

The present disclosure provides concepts that are in the field of communication and database systems and more particularly in the field of acquisition, analysis, inference and presentation of commodity flow data associated with a fleet of vehicles including trucks, trains, airplanes, helicopters, and so forth.

BACKGROUND

At present, only certain amounts of discrete information regarding the global flow of various commodities is available in real-time or near real-time. Real-time or near real-time information is of particular interest to commercial traders, economists, and others. Maritime fleet managers may receive reports of ship positions and collect information regarding the disposition of their own ships and their respective cargos. However, this information is not largely publicly available and generally pertains only to specific vessels and is not associated with other data. Information regarding shipping traffic to and from various ports is typically gathered by port authorities and may be publicly available, however such information is often limited in geographic scope.

A large number of variables that affect the global flow of commodities are not accounted for by present maritime data providers in a manner that allows interested parties to receive accurate updates regarding projected arrival times for vessels and their cargos. For example, weather, political unrest, piracy, and even commodity pricing can cause vessels to alter course and speed. Interested parties are currently forced to rely on anecdotal, untimely, spotty reports, and incomplete modeling for the data sets they require.

Heretofore known systems and methods for tracking commodity flows have generally been directed to acquiring tactical information and have been limited in geographic scope. Typical existing systems are static and based on past ship movements, for example, but do not provide accurate information based upon current ship positions.

Heretofore known systems and methods for tracking commodity flows have focused on acquiring information from only one mode of transportation (e.g., pipelines) or a limited number of transportation modes.

SUMMARY

What is needed is an improved set of components, methods and/or infrastructure that incorporates various types of information for accurately predicting worldwide flow of certain commodities involving virtually all shipping of those commodities around the world. This expansive analysis and presentation system is not presently accessible to the interested parties such as traders of the subject commodities or economists interested in global economic trends. Typical existing systems do not provide an intermodal picture that combines data such as tracking of seaborne commodities in transit with cargo information collected from other transportation modes (e.g., pipelines, freight trains, helicopters, trucks, and airplanes). The present disclosure introduces improvements to computerized systems that enable additional data to be collected and analyzed in such a way as to either infer or predict various types of information with respect to commodity movement throughout the world. The disclosure covers both a shipping aspect for vessels on the sea as well as a land-based approach for vehicles such as trucks, trains, airplanes, etc.

An illustrative example of the present disclosure provides a global strategic picture of commodity movements by tracking ships from messaging such as AIS messaging, images and/or radar data from various sources and then combining ship location and movement information with a multitude of other vessel, port, and cargo data sets (the terms ship and vessel are used interchangeably herein). Ship positions are integrated with other data, such as vessel, port characteristics (berths, depth, location, cargo type, or any physical characteristic of the port), cargo, weather, and market information, to create a global strategic picture of commodity flows. The global strategic picture provides detailed commodity flow information to interested parties such as commodities traders, freight traders, brokers, financial specialists, industry analysts, economists, supply chain managers, insurers, international financial markets, and governments. A global strategic picture is generated by combining (i) ship movements gathered by satellite and other sources, with (ii) vessel, port, cargo, weather, market, and other data from existing sources, and (iii) a time history of these data sets.

In one aspect of this disclosure, the new components, algorithms and systems disclosed herein can utilize received data to enable an improved approach of setting freight rates and optimizing or improving freight routes. The algorithms can enable shippers to have a better sense of potential future revenue through strategic route planning which goes beyond a current potential contract. In other words, the system can provide suggestions on which contract to accept by a shipper not simply based on the potential profitability of that current contract, but what overall profitability and efficiency can occur if a respective contract is accepted based on the following one or more contracts which can be obtained based on, for example, a destination port of the first contract and what additional contracts can be obtained for cargo from that port to third port, and so forth.

In another aspect, a method includes (1) receiving digital vessel data for a global fleet of vessels, the digital vessel data being retrieved at least in part from one or more of AIS data, image data and/or radar data from various sources such as satellite, data transmitted by respective vessels of the global fleet of vessels, land base antennas, or data generated to fill in gaps from data that are incomplete or inaccurate, (2) combining one or more of the digital vessel data, historical vessel location data, vessel location data, vessel physical characteristics data, port physical characteristics data associated with a port and known patterns of maritime trade flows, to yield first combined data and (3) inferring, based on the first combined data, a loaded/empty status of at least one of a vessel or a type of cargo in the vessel. The method can also include (4) combining, via the processor, one or more of the digital vessel data, the vessel location data, the historical vessel location data, the vessel physical characteristics data, the port physical characteristics data, the type of cargo and the loaded/empty status of the vessel to yield second combined data, (5) receiving data regarding one or more of supply, demand, and amount of available cargo to yield third combined data and (6) generating, based on one or more of the first combined data, the second combined data and the third combined data, information relating to a supply of vessels available to load at a specified port and/or deliver a cargo to a specified port, in each case within a specified period of time. Other steps can include generating suggestions for one or more vessels regarding future routes based on one or more of the first combined data, the second combined data and the third combined data or inferring the loaded/empty status of a plurality of vessels.

The digital vessel data can include two or more of satellite data, AIS data, image data and/or radar data received from one or more of ground-based receiver, satellite, or other data transmitted by the global fleet of vessels. The data can also include reconstructed or extrapolated data from incomplete or inaccurate vessel messages that are reconstructed or extrapolated according to a time-based analysis of the incomplete or inaccurate messages. The first combined data can include a combination of two or more of the digital vessel data, the historical vessel location data, the vessel location data, the vessel physical characteristics data, the port physical characteristics data and the known patterns of maritime trade flows.

In one aspect of incomplete or inaccurate data, the system extrapolates the course of a vessel, as opposed to repairing the broken messages. For example, assume a vessel leaves the Gulf of Mexico and due to storms or satellite location, the system does not hear from the vessel for three days. When the system receives a message from that vessel, the system can proceed to fill in the missing location data where no messages were received for several days. Thus, the path of the vessel can be extrapolated from the data that was received.

In another aspect, messages received after leaving the Gulf of Mexico, the messages show the vessel in various locations throughout the world, even on land. The vessel is transmitting properly the messages but the satellite mixed up the message, the system may ignore the messages placing the vessel on land by way of location. The data can be extrapolated data from incomplete or inaccurate vessel messages.

The port physical characteristics data can include one or more of an operational status of the port, a position of the port, a capacity of the port, a size of the port, a number of berths within the port, a location of the berths within the port, draft restrictions at the port, cargo handled by the port, and cargo handled at respective berths within the port. Any physical characteristic of the port can be utilized as port data.

Any of the principles disclosed herein can also equally apply to other vessel besides boats, such as trucks, trains, helicopters, drones, airplanes and so forth. Any vehicle or machine used to transport goods is contemplated as within the scope of this disclosure. A fleet of vehicles can include a heterogeneous fleet including two or more of trains, cars, trucks, trains, drones, helicopters, airplanes, robots, etc. In this scenario, the data such as the port data or dock data can apply to a trucking loading dock or warehouse, and all of the physical characteristics associated with the loading dock or warehouse, and so forth. In another aspect, the concepts disclosed herein can apply to supersets of data and can combine different types of vessel data to provide an even more broad overview of the movement of cargo between ships, trucks, trains, helicopters, drones, airplanes and so forth.

An example of the vehicle aspect is the following. A method includes receiving digital data associated with a fleet of vehicles, combining one or more of the digital data, historical vehicle location data, vehicle location data, vehicle physical characteristics data, dock physical characteristics data associated with a dock and known patterns of trade flows using the fleet of vehicles, to yield first combined data. The method includes inferring, based on the first combined data, a loaded/empty status of at least one of a vehicle or a type of cargo in the vehicle, combining one or more of the digital data, the vehicle location data, the historical vehicle location data, the vehicle physical characteristics data, the dock physical characteristics data, the type of cargo and the loaded/empty status of the vehicle to yield second combined data, receiving data regarding one or more of a supply, a demand, and an amount of available cargo to yield third combined data, generating, based on one or more of the first combined data, the second combined data and the third combined data, information relating to a supply of vehicles available to load at a specified dock and/or deliver a cargo to a specified dock, in each case within a specified period of time and generating suggestions for one or more vehicles regarding future routes based on one or more of the first combined data, the second combined data and the third combined data.

A system example related to vehicles includes a first data receiving component configured to receive digital data for a fleet of vehicles, a first data combiner configured to combine one or more of the digital data, historical vehicle location data, vehicle location data, vehicle physical characteristics data, dock physical characteristics data associated with a dock and known patterns of trade flows, to yield first combined data, an inferring component configured to infer, based on the first combined data, a loaded/empty status of at least one of a vehicle or a type of cargo in the vehicle, a second data combiner configured to combine one or more of the digital data, the vehicles location data, the historical vehicles location data, the vehicles physical characteristics data, the dock physical characteristics data, the type of cargo and the loaded/empty status of the vehicles to yield second combined data, a second data receiving component configured to receive data regarding one or more of supply, demand, and amount of available cargo to yield third combined data, a first generating component configured to generate, based on one or more of the first combined data, the second combined data and the third combined data, information relating to a supply of vehicles available to load at a specified dock and/or deliver a cargo to a specified dock, in each case within a specified period of time and a second generating component configured to generate suggestions for one or more vehicles regarding future routes based on one or more of the first combined data, the second combined data and the third combined data.

BRIEF DESCRIPTION OF THE DRAWINGS

The foregoing and other features and advantages of the present disclosure will be more fully understood from the following detailed description of illustrative embodiments, taken in conjunction with the accompanying drawings in which:

FIG. 14A illustrates a method embodiment; and

DETAILED DESCRIPTION

Figure 1:
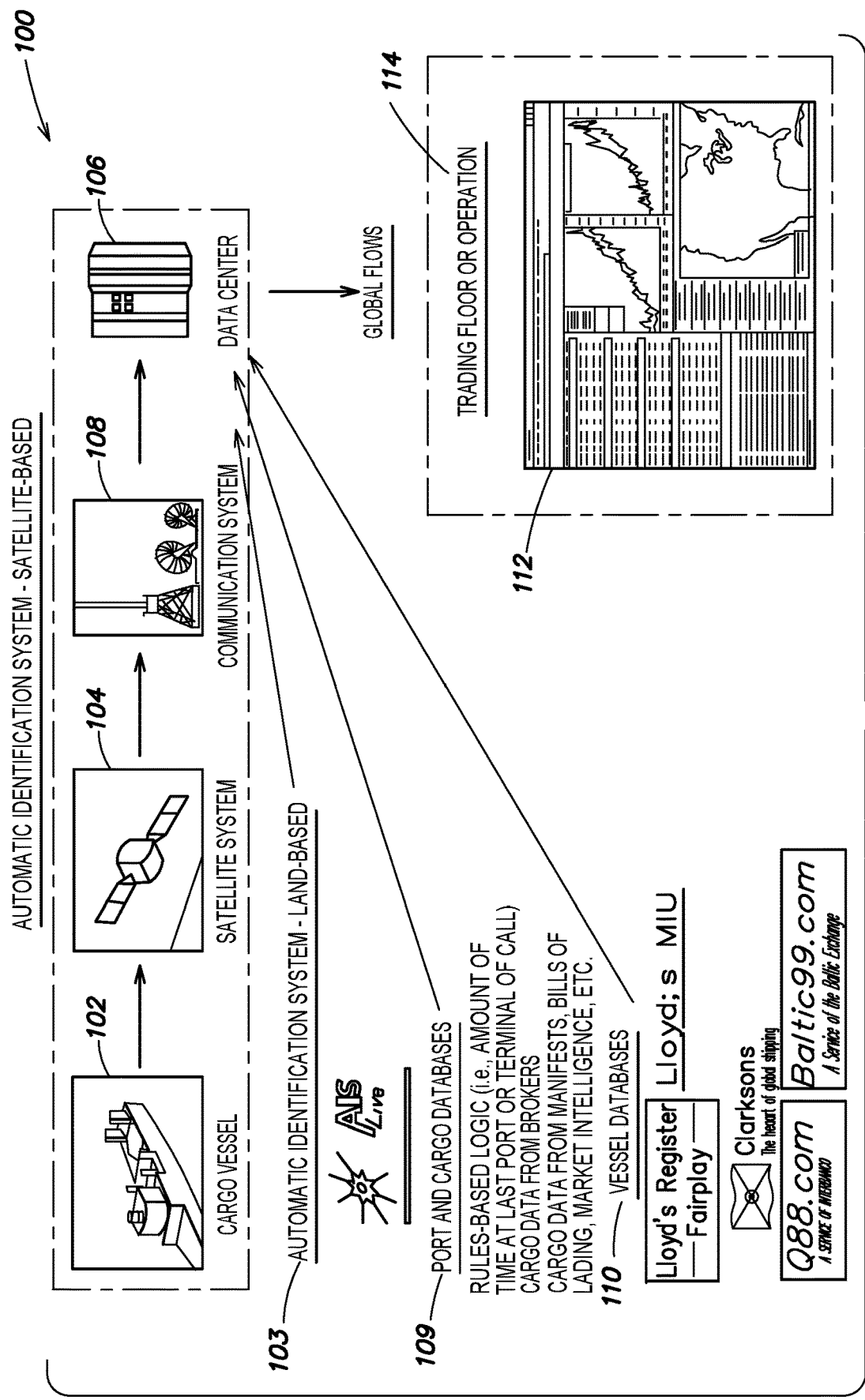
FIG. 1 is a system block diagram of a system for providing global shipping and cargo information according to an illustrative embodiment of the disclosure.

The present disclosure addresses the deficiencies in typical systems and introduces new methods, computer systems, components and algorithms that improve the functioning of a computer system to provide new functionality not previously contemplated or implemented in prior systems.

An illustrative embodiment of the present disclosure is described with reference to FIG. 1, in which a global strategic picture is generated by combining (i) ship movements gathered by AIS messages, radar, images and/or other data from any source, with (ii) vessel, port, cargo, weather, market, and other data from existing sources and (iii) a time history of these data sets. Such other sources of ship movement information may include the Lloyd's Register database by Lloyd's Register—Fairplay Limited of Surrey, United Kingdom, the AISLive database by AISLive Ltd., a United Kingdom-based company wholly owned by Lloyd's Register—Fairplay Limited of Surrey, United Kingdom, the Lloyd's MIU database by Lloyd's Maritime Intelligence Unit—Informa plc of London, United Kingdom, the Clarksons database by Clarkson Research Services Limited of London, United Kingdom, and the Q88 or Baltic99 databases by Heidenreich Innovations LLC, of Greenwich, Connecticut, U.S.A., for example. Similar movement information can be obtained for truck movement, train movement, drone movement, airplane movement, or any other vehicle movement for products. Vehicle movement can includes vehicle speed, congestion information for vehicles such as traffic patterns. Vehicle congestion data can include traffic patterns information, airplane/helicopter/drone congestion information, data about traffic jams, etc. All discussions about ships disclosed herein can also be applied to any vehicle or device that is used for moving goods from one place to another.

Attention is drawn to the terms "ship location data," "vessel data," "cargo data," "port data," "weather data," and "market data." Ship location data include, but are not limited to, International Maritime Organization (IMO) number, Maritime Mobile Service Identity (MMSI) number, vessel name, current latitude/longitude, heading, course, speed, and navigational status (e.g., anchored, underway). Ship location data may be gathered by satellite-based Automatic Identification System (AIS) receivers, land-based AIS receivers, ship-based AIS receivers, Inmarsat-C GMDSS positions, Global Positioning System (GPS) positions, Long Range Identification and Tracking (LRIT) systems, ship-based weather reporting, object-oriented analysis of high-resolution satellite images, ship location self-reporting, radar, other ship-based receivers, and market intelligence on vessel movements (e.g., oil tanker sightings by port agents), as well as methods hereafter disclosed. One aspect of this disclosure is also dealing with incomplete or inaccurate messages from any of these sources, and how to utilize other data to reconstruct or extrapolate what the message data is for any particular type of message. The system can also extrapolate a vessel path or predict a vessel path based on a received message and previous data that is known about the vessel, such as a starting port.

Vessel data include, but are not limited to, as IMO number, MMSI number, vessel name, vessel type, tonnage, cargo type(s), cargo capacity, draft, age, owner, operator, charterer, length of charter, mechanical history, inspection history, certifications, previous ports of call, departure time, loaded/empty status, expected port(s) of call, and estimated time(s) of arrival.

In a vehicle context, AIS data, location-based data, identification data, can also be used to infer shipping or cargo data as disclosed herein. The identification data associated with vehicles can be of a different protocol or structure when compared with formal AIS data for ships, but the general concept is similar with respect to vehicle identification and other relevant data.

Port data include, but are not limited to, such information as cargo type(s), load/offload rates by cargo type or terminal, terminal capacity, storage capacity, harbor congestion, navigational status (e.g., accidents restricting terminal access), draft restrictions, number of berths, draft restrictions, equipment available at a berth or loading dock, previous port cargo history, and terminal owner/management contact information. In a vehicle application, congestion data can include any data about congestion being currently experienced or predicted for any vehicle such as trucks, trains, planes, drones, helicopters, etc.

Cargo data include, but are not limited to, type of cargo (e.g., crude oil), subtype of cargo (e.g., grade of crude oil), amount of cargo in a storage facility, amount of cargo loaded on a vessel, broker data on charter fixtures, bills of lading, cargo manifests, certificates of origin, certificates of quality and quantity, master's receipt of samples, US Customs data, customs data from other countries, and tariff data.

Weather data include, but are not limited to, weather reports, weather forecasts, and information on rainfall, hurricanes, typhoons, tropical storms, tsunamis, and other severe weather events. Market data include, but are not limited to, commodity prices, spot market prices, futures prices, options prices, information on swaps, information on derivatives, supply or expected supply of certain commodities, demand or expected demand of certain commodities, information from exchanges (e.g., NYMEX), information from over-the-counter (OTC) trades, chartering rates, freight rates, economic data, economic trends, world trade data, export data, import data, security risks, market intelligence, market news, and market updates. Economic, trade, export, and import data are available at the local, state, national, regional, and/or international levels, and from public sources (e.g., official statistics) and/or private sources (e.g., data services provided by private companies, such as Bloomberg, IHS Global Insight, etc.)

With regard to loaded/empty status and cargo data, attention is also drawn to the term "likely," which may mean about 70% or greater accuracy when data are aggregated over a one-year time period. The loaded/empty status of the vessel/vehicle can also include a probability or a likely load amount, such as 50% full or completely fully loaded. For example, depending on vessel draft, and based on the inferred cargo type, the conclusion of the system might be that the ship is 80% full of cargo.

The illustrative embodiment of FIG. 1 includes a system 100 for providing global shipping and cargo information. The system 100 includes at least one vessel 102 having a position reporting device and at least one satellite 104 receiving vessel position information from the position reporting device or at least one land-based receiver 103 receiving vessel position information from the position report device. The system also includes at least one data center 106 receiving the vessel position information from the satellite 104 via a communication system 108 or receiving the vessel position information from the land-based receiver 103. The data center 106 combines the position information with at least one ship information database 110 and at least one ancillary database (e.g., port, cargo, weather, and market data) 109 to generate a global strategic picture 112 of the global shipping and cargo information. The system also includes a user computing device 114 in communication with the data center 106. The user computing device 114 receives the global strategic picture 112 from the data center.

Figure 2:
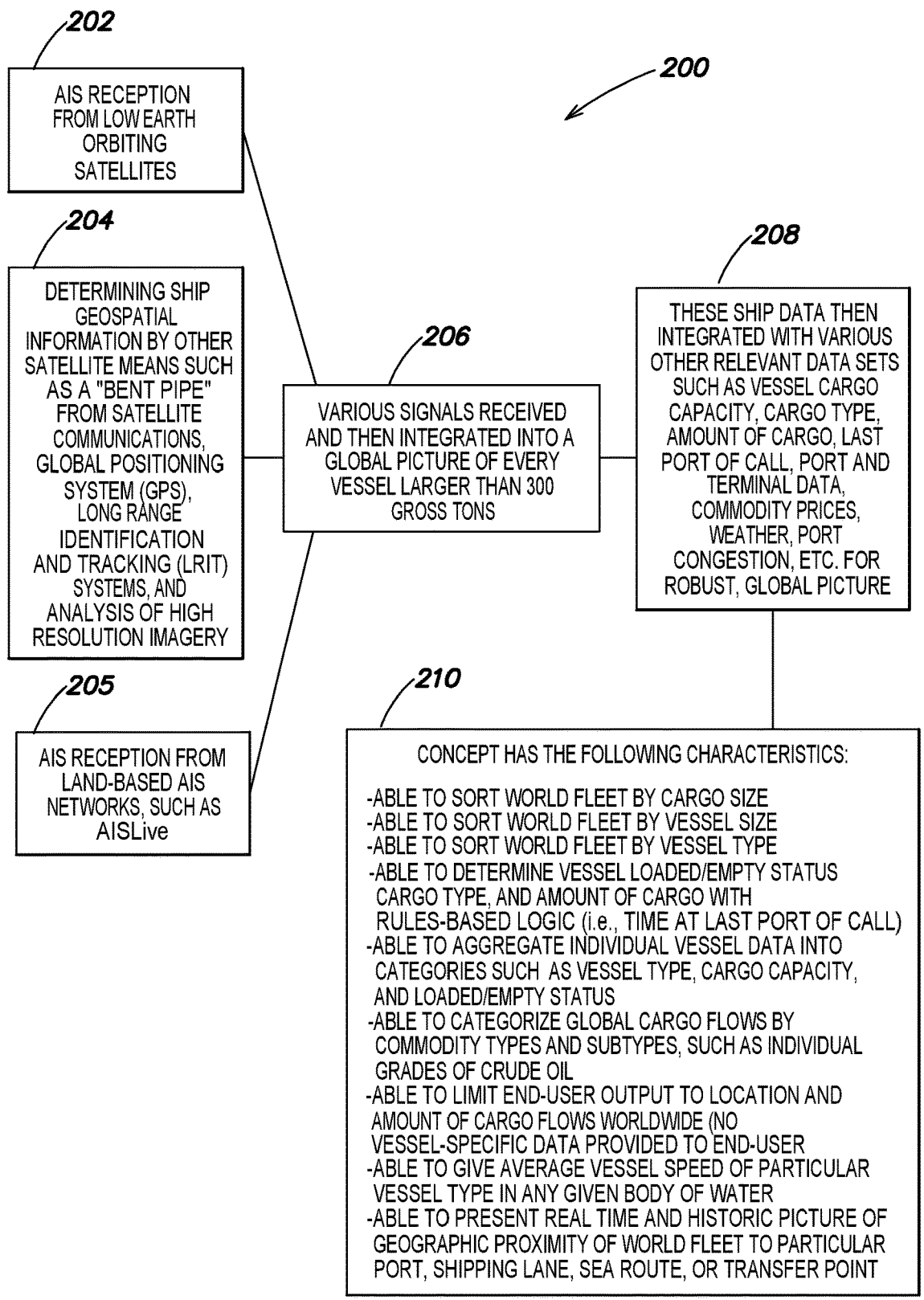
FIG. 2 is a process flow diagram describing a system and method for providing global shipping and cargo information according to a particular embodiment of the disclosure.

An illustrative implementation of the present disclosure is described with reference to FIG. 2 in which ship position information is received as AIS information from a low earth orbiting satellite (202). Ship geospatial information is determined by other satellite means such as a satellite that permits voice communications using a single uplink frequency on one amateur band and a single downlink frequency on another amateur band known as "bent pipe" from satellite communications, GPS, location-based data, LRIT systems, and object-oriented analysis of high resolution satellite images (204). Ship position information is also received as AIS information from land-based AIS networks, such as the AISLive database by AISLive Ltd., a United Kingdom-based company wholly owned by Lloyd's Register—Fairplay Limited of Surrey, United Kingdom (205). The various received signals are then integrated into a global picture of every vessel larger than 300 gross tons (206). The ship data are then integrated with various other relevant data sets such as vessel cargo capacity, cargo type, amount of cargo, port data, previous ports of call, port and terminal data, commodity prices, weather, port congestion, data about other cargo carriers such as truck, trains, helicopters, drones, airplanes, image data, or radar data associated with any vehicle or vessel associated with the cargo, reconstructed or extrapolated message data, or extrapolate or reconstruct a vessel path, etc. (208). The illustrative implementation includes a computer component for sorting world fleet information at once by cargo type, ship size, or vessel type; a computer component to determine likely vessel loaded/empty status, likely cargo type and subtype, and likely amount of cargo with rules-based logic (e.g., particular ports are points of transfer for specific cargo, time a ship is located at a port of call as an indicator of whether there was time to fully or partially load a ship), a computer component configured to aggregate individual vessel data into categories such as vessel type, cargo capacity, and loaded/empty status, means to categorize global cargo flows by commodity type and subtypes, such as individual grades of crude oil, a computer component configured to provide average vessel speed for particular ships in any given body of water; and a computer component configured to present a real-time picture and an historic picture of geographic proximity of a world fleet relative to a particular port, shipping lane, sea route, or transit point (210).

An illustrative embodiment of a global strategic picture can be thought of as a dynamic "data cube" with three axes—X-axis, Y-axis, and Z-axis—producing useful combinations of data moving through time. The X-axis of the data cube includes vessel, port, cargo, and other data from existing sources. These data may come from existing sources such as the Lloyd's Register, Lloyd's MIU, Clarksons and Q88 databases. The Y-axis of the data cube includes ship location data. These data will come from satellite sources, such as ORBCOMM and COM DEV, and other land-based sources, such as AISLive or image or radar data from sources. In this example, the Z-axis of the data cube represents time.

AIS information or the like can also be provided for vehicles of any type. The structure or protocols for identification information for vehicles might be proprietary or different than the AIS structure for shipping but the concept is similar. Where vehicles of any type transmit identification information, that information can be used as well by the system to infer cargo, trade patterns or other data as described herein.

The time history of ship movements and cargo information (including likely cargo information) is useful to create a record of commodity flows, allowing for statistical trend analysis. This is a useful contribution in part because one can study global commodity movements in hindsight, using data that is global in scope and comprehensiveness. This may contribute to all kinds of analyses, including how temperature swings, changes in economic conditions, changes in world trade, and geopolitical events affect the production, transportation, and importation of commodities, such as crude oil. This trend analysis will afford new insights into how global economies interact with each other as well as market intelligence into how economies will respond to shocks, disruptions, or other pressures in contrast to past observed global commodity movements. This statistical analysis can be both quantitative and qualitative, looking for micro- and macro trends based on the first worldwide data archiving of observed global fleet movements. These trends can extend into the land component of a commodity such as corn where seeding, harvesting, storing, shipping via truck or train to a ship can all be analyzed as well to evaluate, predict, infer and guide the movement of commodities.

In one embodiment, subscribers may access these data through a web-based user interface and/or via an existing distribution network such as Reuters, Bloomberg, or PIRA Energy Group, for example. Subscribers can set parameters and filters to organize and search the data over a user-defined time period (e.g., based on the start of the trading day for their location, bi-daily, hourly, etc.). Users can generate value-added outputs such as the average speed of the crude oil tanker or LNG (liquefied natural gas) carrier fleet, how weather affects macro-ship movements, the physical location of all crude oil tankers or LNG carriers vis-à-vis spot markets, a macro-picture of port congestion, and market intelligence on time spreads between futures contracts for different months, value spreads between futures contracts for different grades of crude oil, OPEC exports of crude oil, non-OECD imports of crude oil, edge on EIA and OECD official statistics, and early notice on supply shocks or diversions of tankers between markets. The user interface software may present data in numerous formats such as (i) via a web-based interface, (ii) downloaded data presented in a spreadsheet user interface, such as Microsoft Excel, (iii) geospatially formatted data for a user interface such as Google Earth or Google Maps, and/or (iv) a live data feed.

One primary data source for ship geospatial information according to illustrative embodiments of the disclosure includes satellite reception of AIS transmissions from individual ships. ORBCOMM has installed AIS receivers on their newest constellation of low earth orbiting satellites. COM DEV has an existing AIS satellite. Additional AIS satellites are likely to be available soon. As presently configured, AIS data provides a vessel-specific IMO number, a vessel-specific MMSI number, a vessel call sign, and dynamic information from the ship's navigation systems including current latitude/longitude position, course, speed, destination, estimated time of arrival, previous ports of call, and navigational status (e.g., anchored). While AIS transmissions were originally intended for reception by local ground-based stations, reception of these transmissions by satellite according to illustrative embodiments of the present disclosure provides an improved method of maritime data collection for ships anywhere on earth.

In one aspect, this disclosure provides for an method of reconstructing or extrapolating messages, such as an MMSI message or AIS message, that is corrupted, incomplete or inaccurate by evaluating or predicting the time the message was sent, and coordinating that data with known shipping position data or vehicle position data to infer or identify the source vessel and thus fill in missing gaps of data over time. In this way, a previously useless and discarded message can now contain valuable information and be used in the analysis. The system can also utilize a message to reconstruct or extrapolate a vessel path where messages which would have indicated the path are missing or corrupted.

Another data source for ship geospatial information according to illustrative embodiments of the disclosure include input from other ship positional data sources such as Inmarsat-C GMDSS positions, GPS positions, LRIT systems, ship-based weather reporting, object-oriented analysis of high-resolution satellite images, ship location self-reporting, radar, land-based AIS receivers, such as the AISLive network, ship-based AIS receivers, other ship-based receivers, and market intelligence on vessel movements (e.g., oil tanker sightings by port agents), among other sources. The shipping location information from various sources is then incorporated with a multitude of other data sets to create a new global picture of commodity flows.

Other data sets that can be incorporated with ship location information according to various embodiments of the disclosure include, but are not limited to, vessel, port, cargo, weather, and market data. Data can be aggregated for each combination of commodity type, ports of call, and ship type. Variance and standard deviation of each data field at the ship and aggregated level is also provided.

Figure 3:
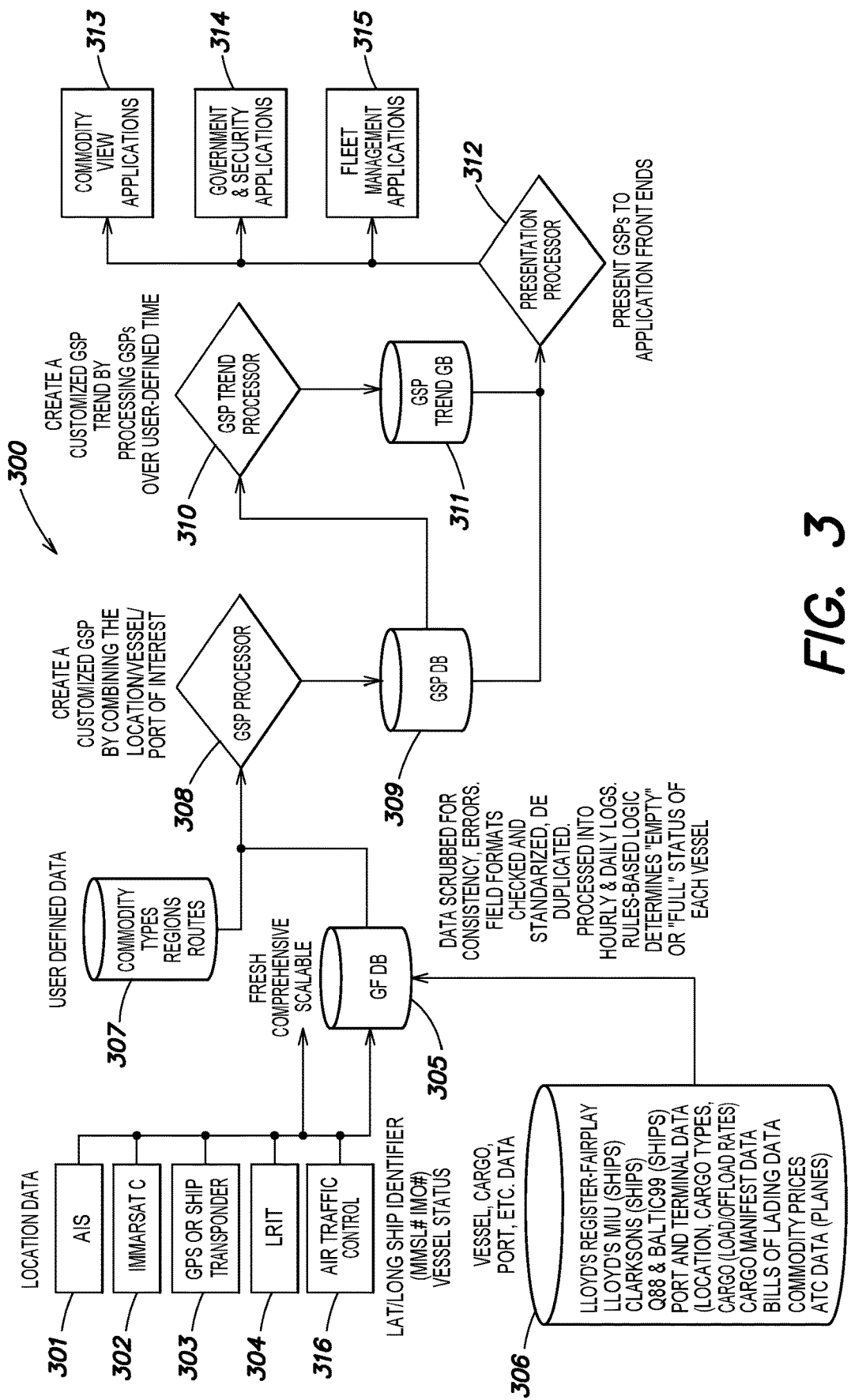
FIG. 3 is a more detailed system block diagram of a system for providing global shipping and cargo information according to various illustrative embodiments of the disclosure.

A particular embodiment of the disclosure which combines various data sources is described with reference to FIG. 3. Location data such as AIS data 301, Inmarsat C data 302, GPS or ship transponder data 303, LRIT data 304, and air traffic control data 316 is communicated to a first database 305. Location data takes the form of latitude/longitude data, which is linked to a specific vessel using a unique vessel identifier, such as MMSI number or IMO number. Vessel data, cargo data, and port data 306 such as Lloyd's Register—Fairplay ship information, Lloyd's MIU ship information, Clarksons ship information, Q88 and Baltic99 ship information, port and terminal data (e.g., location, cargo types, cargo load/offload rates), cargo manifest data, bills of lading data, commodity prices, air traffic control data and other port data is also communicated to the first database 305. The first database is scrubbed for data consistency and errors. Field formats are checked, standardized and de-duplicated. The first database is then processed into hourly and daily logs. Rules-based logic determines likely "empty" or "full" status of each vessel, and matches likely cargo data to each vessel. A partially full status can also be used. A global strategic picture (GSP) processor 308 combines data from the first database 305 with user defined data 307 such as commodity type information, route information, and region information to create a customized global strategic picture (GSP). The GSP is then stored in a GSP database 309 and can be accessed by a GSP trend processor 310. The GSP trend processor can create a customized GSP trend by processing GSPs over a user-defined time period. The GSP trend can then be stored in a GSP trend database 311. The GSP database 309 can also be accessed by a presentation processor 312 which presents the GSPs to various application front ends. Such applications include commodity view applications 313, government and security applications 314 and fleet management applications 315.

Embodiments of the disclosure provide commodity prices at various markets around the world and may be provided to users through commodity view applications 313. For example, LNG is currently traded in four markets: North American, European, NE Asian, and SE Asia. This disclosure will provide current spot market prices and futures market prices for a variety of commodities in various markets around the world. This supplements the global strategic picture of commodity movements. Embodiments of the present disclosure may provide a comprehensive real-time, or near real-time, global strategic picture of commodity movements that is constantly updated and captures the dynamic nature of international shipping.

Embodiments of the disclosure can provide a real-time, as well as historical, global picture of world trade patterns and trends to, for example, a user computing device 114. This will provide data on local, state, national, regional, and international exports and imports in advance of available public sources (e.g., the release of official statistics) and/or private sources. This will be particularly valuable to economists, industry analysts, and equity researchers who specialize in understanding and predicting global economic trends and world trade patterns ahead of the market. For example, this will provide an early indication of which countries are experiencing significant increases or decreases in export and/or import volumes. Embodiments of the disclosure will also be valuable because the world trade and economic data will be collected using a different methodology than current sources (e.g., statistics gathered using surveys and interviews).

Embodiments of the disclosure may also provide software that allows a user to select a kind of cargo or product carried aboard ship to track/see. This is especially valuable for financial transactions such as trading, futures, derivatives, etc. on especially two kinds of cargo: 1) "wet bulk" such as crude oil, refined petroleum products, chemicals, etc. and 2) "dry bulk" such as agricultural products, metals, coal, steel, etc., although it would not be limited to these cargo types alone.

As non-limiting examples, embodiments of the disclosure will usefully consider the following vessel types to create a global or regional strategic picture of cargo flows, categorized by cargo type or vessel type: LNG carriers, liquefied petroleum gas (LPG) carriers, ethylene carriers, very large crude carrier (VLCC) tankers, ultra large crude carrier (ULCC) tankers, Suezmax tankers, shuttle tankers, Panamax tankers, Aframax tankers, handysize tankers, wine tankers, fruit juice tankers, water tankers, sulfuric acid tankers, phosphoric acid tankers, palm oil tankers, methanol tankers, m. sulfur tankers, m. phosphorus tankers, edible oil tankers, asphalt & bitumen tankers, bauxite bulkers, cement bulkers, chip bulkers, forest product bulkers, gypsum bulkers, limestone bulkers, lumber bulkers, ore bulkers, pipe bulkers, stone chip bulkers, etc. Also any kind of tuck, train, drone, airplane or any other vessel will be taken into account.

Certain ships/vehicles carry multiple cargoes. This disclosure resolves that issue by monitoring the time each vessel spends at each port, and matching that with the cargo type of that port and the load/offload rate through ship information databases 110, ancillary database 109 containing port and cargo information, or a combination thereof. Other sources of cargo information for multi-cargo vessels include broker data on charter fixtures, bills of lading, vessel self-reporting, and personal communications with individual vessels, their owners, or operators all of which may be accessed by the system 100.

Embodiments of the disclosure provide an abstract view of the global supply curve at any point in time for each combination of commodity type or types, port or ports of call, ship type or types, and date range, which may be stored in, for example, the first database 305. This will be valuable information for commodities traders, brokers, freight traders, industry analysts, economists, and other financial specialists, as well as owners, shippers, ship managers, port operators, supply chain managers, insurers, and others in the shipping business who could benefit from increased transparency in spot markets and futures markets for commodities, such as crude oil, natural gas, refined petroleum products, aluminum, copper, iron ore, lumber, etc.

Embodiments of the disclosure may use rules-based logic, Bayesian logic, neural networks, learning algorithms, or other mathematical methods to integrate (i) data on vessel location for many or substantially all vessels in the world fleet, and (ii) data on vessel type, vessel cargo capacity, cargo type, and vessel tonnage with (iii) likely loaded/empty status and likely amount of loaded/offloaded cargo, to create a global strategic picture of commodity movements. The global picture can also enable the forecast of shipping rates for ships or vehicles, and suggest what contracts a vehicle or vessel should accept based on projected future earnings or efficiency of the next or one or more future shipping contracts. Unique ship identifiers, such as MMSI numbers and IMO numbers, allow for integrating, aggregating, and filtering data by vessel location, vessel type, vessel cargo capacity, vessel tonnage, cargo type, likely amount of cargo, and likely loaded/empty status.

Embodiments of the disclosure use a rules-based logic to determine likely "loaded" or "empty" status for an individual vessel, based on that individual vessel's previous ports of call or another vessel engaged in lightering activities. For ports, likely loaded/empty status can be determined by matching vessel location data with port location data over time. If a cargo vessel spends more than X number of hours at a certain loading-berth, then the rules-based logic designates that vessel as "loaded" when it departs that loading-berth. The system can also infer or predict if it is partially loaded, such as 80% capacity based on cargo and how much time the ship was at the berth, and/or other factors. If a cargo vessel spends more than X number of hours at a certain offloading-berth, then the rules-based logic designates that vessel as "empty" when it departs that offloading-berth. In other embodiments "loaded" or "empty," or likely "loaded" or "empty," status can be determined by such methods as Bayesian logic, neural networks, learning algorithms, other mathematical methods, direct inquiry to owners, shippers or port personnel or by historic data (e.g., scheduled shipping) or additional contextual or inferential data (e.g., season, port, type of ship, market conditions etc.).

For example, if an LNG vessel stops for more than 6 hours at an LNG loading-berth in Qatar, the rules-based logic designates that LNG vessel as "loaded" when it departs that loading-berth. Similarly, if an LNG vessel stops for more than 6 hours at the LNG offloading-berth in Everett, Massachusetts, the rules-based logic designates that LNG vessel as "empty" when it departs that offloading-berth. Again, a finer granularity can also be provided in which a percentage of a full load can also be predicted.

The "loaded/empty status" rules-based logic combines the static latitude/longitude information of the loading- and offloading-berth, with the dynamic latitude/longitude position information for each vessel. Whether or not stated as "likely," the potential inferential status of such designations is acceptable for the practice of this disclosure.

Lightering involves a larger vessel offloading cargo on to a smaller vessel because of draft restrictions in a nearby port of call. For vessels engaged in lightering activities, loaded/empty status is determined by matching location data for the larger vessel with the location data for the smaller vessel over time. If a smaller vessel spends more than X number of hours (a number based on factors such as known or estimated capacity or displacement) alongside a larger vessel, then the rules-based logic designates the smaller vessel as "loaded" with the same cargo type as the larger vessel had.

Embodiments of the disclosure use each vessel's unique identifier (e.g., MMSI number) to match "loaded/empty status" with vessel data, such as vessel type, vessel cargo capacity, and vessel tonnage.

In addition to using the latitude/longitude points (or other global positioning reference points) for a certain loading- and offloading-berth, the "loaded/empty status" rules-based logic can use a pre-defined geographic area to determine the applicable loading- and offloading-berth. For example, the rules-based logic can use a proximity figure such as a 10-mile radius from a certain latitude/longitude point to define an expanded geographic area for an loading- and offloading-berth or another vessel engaged in lightering. After a vessel spends a minimum amount of time within that 10-mile radius, the rules-based logic determines loaded/empty status for that vessel.

When a vessel makes multiple ports of call at crude oil loading or unloading berths, "loaded" status may be represented by a percentage (e.g., 60% loaded), as noted above.

Embodiments of the disclosure use a rules-based logic that combines time spent at a certain loading- and offloading-berth or another vessel engaged in lightering with the load/offload rate of cargo to determine the likely amount of cargo loaded/unloaded at the loading- and offloading-berth or another vessel engaged in lightering. For example, if a crude oil tanker spends six hours at a crude oil loading-berth with a 10,000 barrel per hour load rate, the rules-based logic calculates that 60,000 barrels of oil were likely loaded on that tanker.

When a vessel makes multiple ports of call at crude oil loading- or offloading-berths, or vessels engaged in lightering, the load/offload rates at those berths can be used to determine the likely percentage "loaded" status of that vessel (e.g., 60% loaded). For example, if a crude oil tanker leaves a crude oil loading-berth in Saudi Arabia 100% loaded and offloads oil for 6 hours at a crude oil offloading-berth in Singapore on the way to delivering the rest of its crude oil at an import terminal in Ningbo, China, then the offload rate at the Singapore terminal can be used to calculate the likely remaining percentage of oil going to the Ningbo terminal.

Embodiments of the disclosure use cargo information for loading-berths to determine what specific type of cargo is likely loaded on a vessel. Certain loading-berths only export a certain type of a given cargo (e.g., a specific grade of crude oil). For example, if a crude oil tanker loads crude oil at Bonny Terminal in Nigeria, one can infer that the crude oil tanker has loaded Bonny Light crude oil because Bonny Light is the only crude oil exported from Bonny Terminal in Nigeria. This more detailed cargo information is valuable to crude oil traders because various grades of crude trade at different prices in commodity and futures markets.

It is to be appreciated that the properties of certain cargos may be considered in calculations of how much cargo is likely being carried by a particular vessel. For example, different grades of crude oil have different weights. Heavier grades of crude take more cargo space in crude oil tankers than lighter grades do and, thus, require a different calculation to convert cargo capacity from dead weight tons to barrels of oil. Rules-based logic, accounting for the different weights for each grade of crude, will calculate how much cargo or the maximum possible amount of a particular cargo that is likely aboard a particular vessel. In performing such calculations we make note of API gravity, a specific gravity scale developed by the American Petroleum Institute measuring the relative density of various petroleum liquids, expressed in degrees.

Embodiments of the disclosure use rules-based logic, Bayesian logic, neural networks, learning algorithms, or other mathematical methods to produce a useful estimate of how much of a certain type of cargo is being exported from a defined set of loading-berths (aggregating shipments of that specific cargo departing those loading-berths) over a defined time period, and track each cargo shipment over time to show the destination offloading-berth. For example, a rules-based logic allows a useful determination of aggregate crude oil exports from loading-berths located within Organization of Petroleum Exporting Countries (OPEC) countries over a preceding two months, and can include quantitative data on deliveries to destination offloading-berths. These crude oil export data can then be compared to the official or other published statistics. In some instances, the concordance or disparities in data will offer useful market information both as to the volume of shipments and the accuracy of the various reports. Having an accurate picture of crude oil exports and imports as well as an "audit" assessment as to data sources provides interested parties with useful information, including supply indicia that may impact spot and futures prices of crude oil.

Embodiments of the disclosure use a rules-based logic, Bayesian logic, neural networks, learning algorithms, or other mathematical methods to produce a useful estimate of how much of a certain type of cargo is being imported into a user-defined set of offloading-berths (aggregating shipments of that specific cargo arriving at those offloading-berths) over a defined time period, and trace the historical track of each cargo shipment to show the origin loading-berth. For example, a rules-based logic allows a useful determination of aggregate crude oil imports into offloading-berths located within India and China over the last two months, and traces the historical track of those crude oil shipments to their origin loading-berths. These crude oil import data can then be compared to the official or other published statistics.

Embodiments of the disclosure analyze the height of vessels above water to estimate how much of a certain type of cargo is on board the vessel. Vessels laden with cargo sit low in the water, while vessels in ballast sit high in the water. Rules-based logic, Bayesian logic, neural networks, learning algorithms, or other mathematical methods may be used to estimate the amount of cargo in a specific vessel at a certain time, given that vessel's individual specifications and its current height above water. Vessel height above water can be detected by satellite, land-based, sea-based, or air-based surveillance systems, including remote sensing or visual observations by humans (e.g, by harbor masters or port agents), and web cameras in ports or other locations.

Useful data by the process of this disclosure is also developed with limited the end-user output to certain data fields, such as the location (e.g., latitude/longitude) and amount of cargo in transit worldwide for a certain commodity type, such as crude oil. Particular note is made of data including unique vessel identifiers, such as MMSI numbers and IMO numbers, to integrate (i) vessel location data from satellite-based or land-based AIS networks or image or radar information, (ii) vessel data, (iii) loaded/empty status, cargo type, and amount of cargo from previous ports of call, and (iv) cargo, weather, market, and other data from brokers, charterers, shipowners, cargo manifests, bills of lading, and market intelligence. These data are then usefully aggregated worldwide and categorized by vessel type, likely cargo type, and likely loaded/empty status to show all cargo in transit for a certain cargo type, such as crude oil, but without providing individual vessel names or other vessel-specific data to end-users. Similarly, this data aggregation and categorization can show all available tonnage for a certain vessel type, such as crude oil tankers, but without providing individual vessel names or other vessel-specific data to end-users.

The foregoing functionality is useful in instances where security is a concern in offering market information without inclusion of sensitive vessel-specific information.

For example, an embodiment of the disclosure uses MMSI numbers to create a global picture of crude oil flows carried by likely "loaded" crude oil tankers. This involves using MMSI numbers to integrate (i) vessel latitude/longitude data for crude oil tankers received from satellite-based and land-based AIS networks, (ii) cargo capacity and vessel tonnage data for crude oil tankers from several sources, including Lloyd's Register—Fairplay, Lloyd's MRJ, Clarksons, and Q88, (iii) loaded/empty status for crude oil tankers based on previous ports of call, crude oil grade data based on last crude oil loading-berth, and amount of crude oil cargo based on time spent at last crude export or offloading-berth, and (iv) cargo, weather, market, and other crude oil data from brokers, charterers, shipowners, cargo manifests, bills of lading, and market intelligence. These data are then aggregated worldwide for all crude oil tankers and categorized by likely loaded/empty status, likely amount of crude oil on board, and likely crude oil grade to show all crude oil in transit worldwide. This embodiment of the disclosure records these data in a time history. This global picture of crude oil flows does not provide individual vessel names or other vessel-specific data to end-users, but remains valuable for crude oil traders, natural gas traders, refined products traders, freight traders, and other traders who trade commodities that are influenced by crude oil movements. This embodiment of the disclosure involves one or more of the following steps:

(1) Use MMSI Number filter to limit the AIS data from the world fleet to only crude oil tankers.
(2) Use rules-based logic, Bayesian logic, neural networks, learning algorithms, or other mathematical methods to determine likely "loaded" status for each crude oil tanker (unique MMSI Number) whose previous ports of call was a crude oil loading-berth, and the likely crude oil grade loaded at that crude oil loading-berth. When a crude oil tanker makes multiple ports of call at crude oil offloading-berths, likely "loaded" status may be represented by a percentage (e.g., 60%/a loaded).
(3) Integrate the cargo capacity of each "loaded" crude oil tanker (unique MMSI Number) from the cargo capacity data from sources such as Lloyd's Register—Fairplay, Lloyd's MIU, Clarksons, and Q88. This involves matching likely "loaded" status with cargo capacity for each crude oil tanker (same unique MMSI Number).
(4) Use rules-based logic, Bayesian logic, neural networks, learning algorithms, or other mathematical methods to determine the likely amount of crude oil loaded/offloaded on each "loaded" crude oil tanker (unique MMSI Number) by combining time spent at a certain crude oil loading- and offloading-berth with the likely load/offload rate of crude oil at that loading- and offloading-berth.
(5) Use MMSI Number to integrate the AIS data, including latitude/longitude information, for each "loaded" crude oil tanker (unique MMSI Number) with the crude oil cargo data for that crude oil tanker (same unique MMSI Number).
(6) Aggregate the above to show latitude/longitude and likely amount of crude oil cargo for each "loaded" crude oil tanker. Each vessel-specific data combination receives a time stamp.
(7) Aggregate these vessel-specific data combinations to show the latitude/longitude and likely amount of crude oil cargo for all "loaded" crude oil tankers worldwide.
(8) Record the time history of this aggregated picture (likely loaded status, latitude/longitude information from AIS data, cargo capacity, and likely amount of crude oil on board).
(9) Provide end-users with a global picture of crude oil flows, including a time history, without disclosing individual vessel names or other vessel-specific data.

Similarly, for example, an embodiment of the disclosure uses MMSI numbers to create a global picture of available crude oil tanker tonnage from "empty" crude oil tankers. This global picture of available crude oil tanker tonnage need not provide individual vessel names or other vessel-specific data to end-users, but remains valuable for freight traders and other traders who trade commodities that are influenced by available tanker tonnage. This embodiment of the disclosure involves one or more of the following steps:

(1) Use MMSI Number filter to limit the AIS data from the world fleet to only crude oil tankers.
(2) Use rules-based logic, Bayesian logic, neural networks, learning algorithms, or other mathematical methods to determine the likely amount of crude oil offloaded from each crude oil tanker (unique MMSI Number) by combining time spent at a certain crude oil offloading-berth with the likely offload rate of crude oil at that loading- and offloading-berth.
(3) Use rules-based logic, Bayesian logic, neural networks, learning algorithms, or other mathematical methods to determine likely "empty" status for each crude oil tanker (unique MMSI Number) whose previous ports of call was a crude oil offloading-berth, and whose amount of crude oil offloaded at its various stops at offloading-berths is within a threshold of that vessel's cargo capacity. Cargo capacity data can be from sources such as Lloyd's Register—Fairplay, Lloyd's MIU, Clarksons, and Q88, or may be inferred or calculated from aggregate resources.
(4) Integrate the available vessel tonnage of each likely "empty" crude oil tanker (unique MMSI Number) from the vessel tonnage data from sources such as Lloyd's Register—Fairplay, Lloyd's MIU, Clarksons, and Q88. This involves matching likely "empty" status with vessel tonnage for each crude oil tanker (same unique MMSI Number).
(5) Use MMSI Number to integrate the AIS data, including latitude/longitude information, for each "empty" crude oil tanker (unique MMSI Number) with the vessel tonnage for that crude oil tanker (same unique MMSI Number).
(6) Aggregate the above to show latitude/longitude and likely amount of available crude oil tanker vessel tonnage for each "empty" crude oil tanker. Each vessel-specific data combination receives a time stamp.
(7) Aggregate these vessel-specific data combinations to show the latitude/longitude and amount of available crude oil tanker vessel tonnage for all likely "empty" crude oil tankers worldwide.
(8) Record the time history of this aggregated picture (likely empty status, latitude/longitude information from AIS data, and likely available crude oil tanker vessel tonnage).
(9) Provide end-users with a global picture of available crude oil tanker vessel tonnage, including a time history, without disclosing individual vessel names or other vessel-specific data.

Embodiments of the disclosure provide a global picture of commodities in storage on vessels, such as crude oil being stored in oil tankers and motor vehicles being stored in pure car carriers. For crude oil, this phenomenon is referred to as floating storage. Floating storage tends to increase when crude oil prices are low and/or land-based crude oil storage facilities are at capacity or not available. Information on floating storage is valuable to crude oil traders, natural gas traders, refined products traders, freight traders, and other traders who trade commodities that are influenced by crude oil movements, because having an accurate picture of crude oil storage provides interested parties with useful information, including supply indicia that may impact spot and futures prices of crude oil.

Embodiments of the disclosure integrate sea routes into the geographical calculation of distances from vessels to ports. Sea routes can be pre-defined using standard preferred sea routes (e.g., the Suez Canal route from Asia to Northern Europe, which transits the China Seas, Malacca Strait, Indian Ocean, Gulf of Aden, Red Sea, Mediterranean Sea, and English Channel) or user-defined sea routes. Sea route calculations can be integrated from existing sources, such as the sea route software provided by AtoBviaC Plc (Berkhampstead, Hertfordshire, United Kingdom), or calculated manually and added to the rules-based logic that calculates distance from vessels to ports. The integration of sea routes into embodiments of the disclosure allow for more accurate calculations of transit time for an individual vessel or cargo movement to possible destination ports, from port of origin, or to or from other ports of interest.

Embodiments of the disclosure use rules-based logic, Bayesian logic, neural networks, learning algorithms, or other mathematical methods to impute the possible destination ports of a vessel by using vessel location, course, and speed, and by filtering possible destination ports by cargo type, vessel type, or loaded/empty status. For example, if a crude oil tanker is located in the North Atlantic, rules-based logic, Bayesian logic, neural networks, learning algorithms, or other mathematical methods can filter crude oil offloading-berths out of all the ports in the North Atlantic, calculate distances to each possible destination offloading-berth, and integrate relevant historical information (e.g., number of times the said crude oil tanker has called at each of the possible destination offloading-berths) to impute the likely destination offloading-berth. Rules-based logic, Bayesian logic, neural networks, learning algorithms, or other mathematical methods can also sort the possible destination ports according to the estimated probability of the individual vessel or cargo movement calling at each possible destination port.

If the ship location data is only available in irregular time intervals for a certain vessel, embodiments of the disclosure extrapolate the historic path of that vessel by connecting the dots between the ship location data from the two most recent signals. Thresholds are defined so that the extrapolation function does not go awry if incorrect or corrupted ship location data is transmitted. Any message can be used to reconstruct the historical vessel path.

Embodiments of the disclosure allow ship location data, vessel data, port data, cargo data, and other data (such as weather and market information) to be sorted geographically by port(s), country or countries, ocean basin(s), port pairs, country pairs, ocean basin pairs, sea route(s), and key transit points. Geographical parameters are capable of being set for each of the following categories:

Port(s): Sorting by port provides users with export/import information for an individual port or a set of ports.

Country or countries: Sorting by country provides users with export/import information for an individual country or a set of countries. For example, commodity traders can determine the aggregate oil exports from members of the Organization of Petroleum Exporting Countries. Similarly, for example, one can determine the aggregate oil imports to a user-defined set of countries, such as India, China, and South Korea.

Ocean basin(s): The geographic areas of certain ocean basins, such as the Baltic Sea, the Mediterranean, the Arabian Gulf, the North Atlantic, the North Pacific, and the Indian Ocean are defined. This would allow users to assess vessel/cargo flows within an ocean basin or set of ocean basins (e.g., within the Baltic Sea).

Port pairs: Users can assess vessel cargo flows between two or more ports (e.g., from Das Island, United Arab Emirates to Everett, Massachusetts).

Country pairs: Users can assess vessel/cargo flows between two or more countries (e.g., from Russia to Canada).

Ocean basin pairs: Users can assess vessel/cargo flows between two or more ocean basins (e.g., between the Arabian Gulf and the North Sea).

Sea route(s): The geographic areas of certain sea routes, such as the trans-Pacific route, the trans-Atlantic route, and the Asia-to-Europe route are defined. This allows users to assess vessel cargo flows along certain sea routes (e.g., along the Great Circle Route in the Pacific Ocean).

Key transit points: The geographic areas of certain sea routes, such as the Suez Canal, the Panama Canal, the Malacca Straits, the Strait of Gibraltar, the Bosporus, the English Channel, the Cape of Good Hope, and Cape Horn are defined. This allows users to assess vessel cargo flows through certain key transit points (e.g., the Suez Canal)]

Embodiments of the disclosure can be used by freight traders who trade on the availability of merchant vessels. The freight traders are provided with data on the supply of likely empty ("in ballast") vessels in a certain geographical area, such as two days away from Port X (based on average speed and course of each individual vessel). These data can be sorted by ocean basin, such as the North Atlantic or South China Sea. Using filters, freight traders can sort likely empty vessels using categories such as vessel type, vessel tonnage, vessel cargo capacity, and vessel age.

The supply data of likely empty vessels is combined with other data on vessel availability—such as ship owner, ship charterer, length of charters—to give freight traders information on the available supply of likely empty vessels. Using filters, freight traders can sort available likely empty vessels using categories such as vessel type, vessel tonnage, vessel cargo capacity, and vessel age. This can be used to predict freight rates and suggest the optimal or improved utilization of the vessel taking into account the immediately following voyage and voyages that might follow afterward.

In addition to providing freight traders with data on the supply and location of currently empty merchant vessels, analytics can be used to assess when a likely loaded ("laden") vessel would be able to reach a discharge port, unload its cargo, and return to a certain port or ocean basin in X days (based on average speed and historic routes of individual vessels). These data on individual likely loaded vessels could be aggregated to give a picture of the future supply of empty merchant vessels. For example, if a freight trader wants to trade on the availability of VLCC oil tankers in the Port of Jeddah, Saudi Arabia in 30 days, one can calculate which likely loaded merchant vessels could discharge their cargo in ports such as the Port of Rotterdam and, based on their average speed, could reach the Port of Jeddah within 30 days. Using filters, freight traders can sort such vessels using categories, such as vessel type, vessel tonnage, vessel cargo capacity, and vessel age.

The supply data of likely loaded vessels can be combined with other data on vessel availability—such as ship owner, ship charterer, length of charters, chartering rates, and freight rates—to give freight traders information on the available supply of laden vessels, and then use that information to calculate the future availability of empty merchant vessels. Using filters, freight traders can sort such vessels using categories such as vessel type, vessel tonnage, vessel cargo capacity, and vessel age.

When using filters, embodiments of the disclosure can also be used as a global fleet management tool. Such embodiments allow ship owners, management companies, shipping lines, etc. to track their worldwide fleets in real-time as well as forecast freight rates and optimize the efficient use their fleet in the future.

Embodiments of the disclosure are also is useful for port planning. The global strategic picture of commodity flows can help ports manage their operations and make more informed infrastructure investments as they would be able to see the actual shipping and cargo flows passing near their port.

Shippers and logistics companies focused on global supply chain management can use embodiments of the present disclosure to match their supply chain data with the global strategic supply database. This allows embodiments of the disclosure to incorporate at least part of the world's container fleet into the database. Many shippers are pursuing total supply chain visibility so they always know the location of their products. They use GPS transponders, RFIDs, etc. to track containers carrying their products. Of course, GPS, location-based data, AIS or identification data, and so forth, also applies to vehicles such as trucks, drones, etc. For shipping, these technologies do not work when the container is buried 30 boxes down in transit across the ocean because the signals are not strong enough to broadcast through the other containers. Embodiments of the present disclosure cure this deficiency by matching a shipper's global supply chain data with the MMSI number, IMO number or name of the ship carrying the container from Port A to Port B.

Another embodiment allows shippers to track the fleet of ships carrying their goods at any one time. Such shippers may not be interested in the other ships being tracked, but the parameters could be set in an application of the disclosure to show shippers only vessels carrying their goods.

Embodiments of the disclosure can be used by parties such as manufacturers and producers to track the global supply of any given commodity. 'Ibis helps them better manage their manufacturing processes, inventory, and supply chain. For example, ALCOA could track the global flows of bauxite to ensure that they have sufficient inventory to keep their aluminum plants operating or, if there is a supply shock, to assess whether there are available alternative supplies in proximity to their aluminum plants affected by that shock.

Embodiments of the disclosure can be used by marine insurers to ensure insured vessels or cargos are transiting in only approved geographies. Certain marine insurance policies, such as hull & machinery insurance, cargo insurance, and war risk insurance, have special provisions that require additional premiums to be paid if a vessel enters a certain geographical areas. For example, the Joint War Committee of Lloyd's Market Association and the International Underwriting Association of London issues a list of risk areas on its website. Embodiments of the disclosure can be used by banks and other lending institutions to track vessels and cargos that they have financed.

Embodiments of the disclosure keep a record of past ship and cargo flow movements, allowing for historical trend analyses of global ship and cargo flow movements. This is particularly valuable to commodities traders, freight traders, brokers, financial specialists, industry analysts, economists, supply chain managers, insurers, international financial markets, governments, and other parties interested in world trade patterns, exports, imports, global economic trends, and commodity movements.

A database of the present disclosure can sort data by geographic trading areas, including North Asia, SE Asia, Europe, and North America (exact geographical areas to be determined by market research). For example, X ships located in North Asia with Y cargo capacity and estimated transit times to A, B, C ports.

Users can set up customized alerts for certain events, such as when a vessel turns around, when a vessel makes significant deviation in current course, when a vessel makes significant speed change, when a vessel arrives in port, or when a vessel departs a port.

Other customized alerts deal with aggregated cargo in vessels. Embodiments of the disclosure allow users to select a cargo type of interest, such as crude oil, and then create customized alerts for that cargo type. Examples of customized alerts for crude oil include: when X million barrels of crude oil enters the Mediterranean Sea, when X million barrels of crude oil is within Y days sailing time for a user-defined port or set of ports, or when X million barrels of crude oil is exported from a user-defined port or set of ports over Z time period.

Embodiments of the disclosure allow users to create alerts of a supply disruption or anomaly of a user-defined commodity or cargo type (e.g., crude oil), or a user-defined set of commodities or cargo types. Such alerts can be selected from a pre-defined list of shocks or created with a user-defined set of parameters. Examples of alerts for crude oil include: when X million barrels of crude oil has been diverted or delayed by severe weather, when X million barrels of crude oil has been diverted or delayed by piracy or a terrorist attack, when X million barrels of crude oil has been diverted or delayed by a navigational hazard or obstruction in a key transit point (e.g., the Suez Canal), when X million barrels of crude oil has been diverted or delayed by a mechanical problem at a crude loading-berth, or when X million barrels of crude oil has been diverted or delayed by a mechanical problem at a crude offloading-berth.

Embodiments of the disclosure allow users to create alerts that flag outliers from the historical data trends. Outlier alerts can be selected from pre-defined settings or customized with user-defined settings. Outliers can provide market intelligence that could be used for a trading advantage. For example, an alert can be triggered the first time that X million barrels of crude oil is imported into Y port during Z month. Outliers can also provide security intelligence that could be used for anti-piracy, anti-terrorism, drug interdiction, or other security purposes. For example, an alert can be triggered when a ship with an AIS signal is in a part of the ocean where it has not been before or where few ships have previously ventured. Such data is an indicator of possible contraband shipment. Such outlier alerts will account for seasonal variations in shipping patterns.

Embodiments of the disclosure allow users to create customized alerts based on predefined geographic areas, such as ocean basins, market areas, transit points, and ports. These geographic areas have pre-defined parameters and users can select the geographic areas of interest.

Embodiments of the disclosure allow users to create alerts based on customized geographic areas. Users can draw a polygon on a map that covers a specific geographic area, and then create customized alerts related to the geographic area designated by that polygon.

Embodiments of the disclosure notify users of alerts by email, text message, fax, automated phone calls, mobile phone application, web interface, data feed, or via a user-defined system.

Embodiments of the disclosure provide a sophisticated software filter combining AIS satellite information with existing shipping databases to provide comprehensive MDA. Governments can use embodiments of the present disclosure to achieve a critical security application called maritime domain awareness (MDA). Similar to tracking all aircraft in the sky by radar, MDA allows for tracking of all ships at sea to enforce applicable laws and regulations, and prevent nefarious activity, such as illegal fishing in restricted zones, catching polluters discharging prohibited substances (especially as a forensic tool), and catching smugglers of contraband, especially narcotics and human trafficking. Embodiments of the disclosure can be used to verify compliance with treaty obligations, such as the UN Convention on the Law of the Sea, maritime boundary treaties between countries, and treaties governing fishing in restricted areas.

Embodiments of the present disclosure can be used as a forensic tool, to enforce environmental regulations, such as illegal dumping, ship emissions control areas, etc. For example, embodiments of the disclosure could monitor and enforce ship emissions in the Sulfur Emission Control Areas (SECAs), designated by the IMO, where merchant vessels are required to use low-sulfur fuel, or, given a spill, determining which ship may have been the polluter.

There are homeland security applications of an effective MDA picture as well. Applications of the disclosure can be designed to receive amplifying information from government security sources such as classified intelligence and law enforcement data. These represent two examples of official, restricted data sets that could be added to the global strategic picture. In other words, this product could provide private sector platform on which the US Government, or other governments or authorities, add classified government intelligence and other information to create a more robust MDA picture.

Embodiments of the disclosure can integrate analysis of high-resolution satellite images and infrared satellite collection with satellite-based AIS data and land-based AIS data to provide a more complete strategic picture for maritime domain awareness. In this regard, advances in Artificial Intelligence offer useful computer based tools for data manipulation. Vessel, port, and cargo data from other sources can also be integrated into this maritime domain awareness picture, to provide a global strategic picture of vessel and cargo movements for security purposes.

Embodiments of the disclosure can be used to enforce the regulations of the IMO, the US Coast Guard, and other maritime enforcement agencies. For example, embodiments of the disclosure detect which vessels have incorrect MMSI numbers or incorrect IMO numbers in their AIS systems.

Embodiments of the disclosure can be used as a recovery tool to increase the marine transportation system's post-incident resiliency—after a disruption by terrorist attack, hurricane or other natural disaster, or human-related accident—by allowing officials to prioritize ship entry in the queue of waiting or approaching ships. Priority can be given to certain cargos, vessel types, or vessels with certain characteristics (e.g., shallow draft vessels that could avoid navigational hazards related to an incident). For example, in the event that severe weather disrupted the Boston area's natural gas pipeline system, the US Coast Guard could use applications of the disclosure to give priority to a waiting LNG carrier to dock at the LNG offloading-berth in Everett and, thus, avoid a power outage at the power plant next to the terminal.

Embodiments of the disclosure can match available post-incident port capacity with waiting or approaching vessels by comparing (i) port data, such as cargo facilities, storage capacity, and channel depth with (ii) vessel location data, and (iii) vessel data, such as cargo type, cargo capacity, and vessel draft.

Embodiments of the disclosure can improve post-incident intermodal efficiency by identifying which transportation modes pipelines, trucking rail, maritime, and air have available capacity and which transportation modes suffer from temporary disruption. For example, after the 9/11 attacks, with land-based transportation systems disrupted, ferries and merchant vessels helped evacuate lower Manhattan.

Embodiments of the disclosure provide worldwide tracking of specific vessel(s) of interest, such as LNG carriers, vessel types carrying hazardous cargos, known USCG list of safety violators, suspect vessels known to be associated with nefarious activity, North Korean flagged vessels, etc. Combinations of high interest vessels can be tracked and live data streams of their location can be produced. Periodic watch lists can be generated in tabular form or a geospatial picture such as an overlay on Google Earth or Google Maps can be created according to illustrative embodiments.

Embodiments of the present disclosure can be used for distinguishing threats from legitimate commerce more quickly thereby improving national security resiliency. For example, deviations from normal cargo flows can alert intelligence officials to an elevated threat, allowing them to focus limited resources on suspicious activities by distinguishing them from legitimate commerce.

Embodiments can be used to monitor what vessels and cargo flows are arriving/leaving particular ports or countries of interest, such as Iran, North Korea, or known narcotics exporting locations, or for monitoring regulation of fishing fleets. For example, intelligence agencies can monitor how much of a certain cargo, such as grain, a given country imports offering inferential information on food production and the presence of famine.

Embodiments of the disclosure provide an additional safeguard to protect potential victims of piracy in dangerous waters. For example, intelligence agencies and anti-piracy patrols could track vessel types and cargo types in piracy risk areas to focus anti-piracy efforts on vessel types and cargo types that present an elevated risk of pirate attack (e.g., slow-moving laden oil tankers have a higher risk of being attacked by pirates than a fast-moving container vessel).

Embodiments of the disclosure can assist in search and rescue operations wherein software can help identify vessels in distress and assist in finding nearby ships to render assistance. Such embodiments are similar to AMVER, except ubiquitous and comprehensive thereby serving as a search and rescue tool to direct responding USCG assets and identify commercial vessels which may render assistance to a nearby ship in distress.

Scientists, environmentalists, industry and living marine resource managers can use the various embodiments of the disclosure to track and understand shipping's impact on the marine environment. For example, the IMO designates certain Sulfur Emission Control Areas (SECAs) where merchant vessels are required to use low-sulfur fuel.

In a future global cap and trade system and carbon market, ships will also be required to comply with established emission standards. Embodiments of the present disclosure allow for the policing of vessel exhaust discharge, where regulations require ships to burn cleaner fuels when near shore.

Embodiments of the disclosure can integrate the tracking of seaborne commodities in transit with cargo information collected from other transportation modes (such as pipelines, trucks, freight trains, helicopters and airplanes) to provide a global intermodal picture of commodity movements.

Embodiments of the disclosure integrate sea state into vessel speed calculations. Sea state influences the speed at which vessels may operate. For example, in heavy seas, vessels operate at a slower than normal speed. Integrating sea state into the disclosure provides a more accurate global picture of seaborne commodity movements for particular applications.

Embodiments of the disclosure can dynamically generate "license plates" or "unique signature" of critical attributes required for clients/customers out of the varied data streams through intelligent mining and search techniques.

Examples of the present disclosure may include a first illustrative embodiment which tracks the world's LNG carrier fleet and combines that ship location information with data on the LNG fleet from Lloyd's Register—Fairplay, Lloyd's MIU, Clarksons, and Q88. A second illustrative embodiment of the disclosure may add the world's crude carrier fleet—including Very Large Crude Carriers (VLCCs), Ultra Large Crude Carriers (ULCCs), and Suezmax tankers—to the LNG fleet. A third illustrative embodiment of the disclosure may add other vessel categories that carry only one cargo type, for example.

In an illustrative example of databases according to the disclosure, data from disparate sources is integrated by creating a database that combines (i) ship location data from Orbcomm's AIS data, COM DEV's AIS data, and data from terrestrial-based AIS networks with (ii) vessel data from Clarksons, Lloyd's Register—Fairplay, Lloyd's MIU, Q88.com, and Baltic99.com, loaded/empty status, likely cargo type (e.g., grade of crude oil), and likely amount of cargo on board derived from a rules-based logic using last port of call and a list of dedicated loading- and offloading-berths (e.g., for crude oil) or vessels engaged in lightering, and (iv) cargo, weather, market, and other data from brokers, charterers, shipowners, cargo manifests, bills of lading, and market intelligence, for example.

The database is extensible to additional fleets and vessels, and to more data sources in the future (e.g., adding Lloyd's MIU and Q88 vessel data to the Clarksons and Lloyd's Register—Fairplay vessel data), The database is designed to allow for a time history of the various data combinations, providing the Z-axis in the data cube. The database is sortable to determine the current location (latitude/longitude), current course, and current speed of (i) the entire crude oil tanker fleet, (ii) only fully loaded crude oil tankers, (iii) only empty crude oil tankers, and partially loaded crude oil tankers (e.g., 60% loaded), for example.

The following exemplary list of crude oil grades and types illustrates the complexity of crude oil as a commodity, and the value of adding this cargo information into the global strategic picture of crude oil movements: Abu Bukhoosh, Al Shaheen, Alaska North Slope, Alba, Algerian Condensate, Amna, Anasuria, Arab Extra Light, Arab Heavy, Arab Light, Arab Medium, Arab Super Light, Ardjuna, Arun Condensate, Asgard, Attaka, Azadegan, Azeri Light, Bach Ho, Bachaquero, Balder, Basrah Light, BCF 17, Belayim Blend, Belida, Benchamas, Beryl, Bintulu Condensate, Bonny Light, Bontang Condensate, Boscan, Bouri, Bow River, Brass River, Brega, Brent Blend, Brent Sweet, Brunei Light, Cabinda, Canadon Seco, Cano Limon, Captain, Ceiba, Cerro Negro, Champion, Cinta, Cold Lake, Cossack, Cusiana, Daqing, Djeno, Doba Blend, Draugen, Dubai, Dukhan, Dulang, Duri, Ekofisk, Es Sider, Escalante, Escravos, Fife, Hotta, Foinaven, Forcados, Foroozan Blend, Forties, Fulmar, Furrial, Galcota Mix, Gippsland, Girassol, Glitne, Gryphon, Gullfaks, Handil Mix, Hanze, Harding, Heidrun, Hibernia, Iran Heavy, Iran Light, isthmus, Jasmine, Jotun, Khafji, Kirkuk, Kittiwake, Kole, Kuito, Kutubu Blend, Kuwait, Labuan, Laminaria, Lavan Blend, Light Louisiana Sweet, Liuhua, Liverpool Bay, MacCulloch, Mandji, Maureen, Marib, Marlim, Mars Blend, Masila, Maya, Medanito, Minas, Miri, Mixed Blend Sweet, Murban, N'kossa, Nang Nuang, Nanhai Light, Napo, Ncmba, NFC II, Nile Blend, Njord, Nome, NW Shelf Condensate, Olmeca, Oman, Oriente, Oseberg, Oso Condensate, Palanca Blend, Panyu, Pennington, Pierce, Plutonio, Poseidon Streams, Qatar Marine, Qua Iboe, Rabi, Rincon, Ross, Saharan Blend, Sakhalin II, Sarir, Schiehallion, Senipah, Scria Light Export, Shengli, Siberian Light, Ski, Sirri, Sirtica, Slcipncr Condensate, Snorre, Souedieh, South Ame, Statfjord, Suez Blend, Syncrude Sweet Blend, Syrian Light, Tapis, Tempa Rossa, Tengiz, Terra Nova, Thamama Condensate, Tia Juana Heavy, Tia Juana Light, Triton, Troll, Turkmen Blend, Umm Shaif, Upper Zakum, Urals, Varg, Vasconia, Wafra, West Texas Intermediate, Widuri, Wytch Farm, Xikomba, Yoho, Zafiro, Zakum, Zarzaitine, Zuata Sweet, Zueitina, etc.

In addition to reporting current course and speed, the average course and average speed of each type of vessel (e.g., crude oil tankers) is calculated over X number of hours, as well as the average speed of the entire fleet for each type of vessel (e.g., crude oil tankers) over X number of hours. The average speed of the entire fleet for each vessel type (e.g., crude oil tankers) is disaggregated into the average speed of subsets of that fleet, such as (i) fully loaded vessels, (ii) empty vessels, and (iii) partially loaded vessels (e.g., 60% loaded). The average speed of the entire fleet for each vessel type (e.g., crude oil tankers), and its subsets (e.g., loaded crude oil tankers) is also disaggregated geographically by port(s), country or countries, ocean basin(s), port pairs, country pairs, ocean basin pairs, sea route(s), and key transit points. For example, the example embodiment can calculate the average speed of loaded crude oil tankers that departed ports in Saudi Arabia, the average speed of loaded crude oil tankers in the Indian Ocean, or the average speed of loaded crude oil tankers that transited the Suez Canal.

In an exemplary interface of the disclosure, a geospatial interface uses a drop down menu to sort the visual display for (i) the entire world fleet, including options to display the world fleet for each type of vessel (e.g., crude oil tankers), (ii) only loaded vessels, including options to display only laden vessels for each type of vessel (e.g., crude oil tankers), (iii) only empty vessels, including options to display only empty vessels for each type of vessel (e.g., crude oil tankers), or (iv) partially loaded vessels, including options to display only empty vessels for each type of vessel (e.g., crude oil tankers).

In an example of a geospatial interface according to the disclosure, "loaded" and "empty" merchant vessels are color-coded triangles that point in the direction that the vessels are sailing (e.g., loaded vessels are green triangles, while empty vessels are white triangles). Different vessel types, such as crude oil tankers, can have different colors or symbols. it is to be appreciated that data presentation, including presentation by graphical user interface, is a rapidly developing area. The foregoing example is presented as a non-limiting illustrative example, and new data aggregation and presentation tools are being constantly made available.

In the example, clicking on a ship icon provides basic vessel information (ship name, cargo capacity, last port of call, average course over last hour, average speed over last hour). Clicking on a port icon provides basic port information (e.g., crude oil exports/imports over X time period, which would be calculated by the software by adding cargo capacity of crude oil tankers calling at crude oil loading- and offloading-berths over X time period). Clicking on a country provides basic import/export information (e.g., crude oil exports/imports over X time period). This would aggregate similar data from the country's crude oil export/import facilities.

The "X days from Y port information" can be geographically displayed with lines emanating from the ships on the screen to potential ports of call with estimated time of arrival calculated from average speed over the last Z hours, for example. For certain types of vessels, such as crude oil tankers, vessel type can be combined with port type to limit the number of potential ports of call. For example, a crude oil tanker in the North Atlantic would only have lines connecting to crude oil import facilities in North America and Europe.

The example interface has the capacity to block out certain sensitive areas for safety/security purposes, such as piracy hot spots near Somalia.

In another example interface, the entire world fleet for a commodity is represented in terms of volume of global supply and expected time to reach port. For example, from port of Houston, the short term supply picture for crude oil would be displayed as:
  35M barrels/1 day, 13 hours, 32 minutes
  125M barrels/3 days, 5 hours, 18 minutes
  64M barrels/8 days, 8 hours, 52 minutes The time to destination would be updated based on recalculations of the route, average speed, and imputed destination of the ships as they come in.

Another functionality generates alerts when there is any substantial change in the short-term projections of supply. The user has the ability to define a threshold of change in volume of supply, expected time of arrival, or port of arrival such that the application generates an alert any time the forecast for the designated commodity changed above the threshold value. For example, the threshold value could be defined as a change in expected arrival time by more than 1 day. In the example above, if a hurricane in the Atlantic caused ships carrying the 125M barrels of crude oil to go to port.
  Example output might be, in text form:
  35M barrels/1 day, 13 hours, 32 minutes
  *supply shock alert**
  →125M bbl/3 days, 5 hours, 18 minutes→now 125M bbl/6 days, 18 hours, 18 minutes→+3 days, 13 hours
  64M bbl/8 days, 8 hours, 52 minutes The illustrative embodiment of the disclosure would also generate a visual representation of the supply shock in graphical icons in the user interface.

An illustrative embodiment of spreadsheet functionality associated with the disclosure provides an Excel spreadsheet in which a bottom frame of the exemplary web-based user-interface includes several lists of boxes/categories to check (these lists of boxes/categories are outlined below). Note that spreadsheet is to be broadly construed to include any data aggregation graphic, including paper graphs and charts as well as "on-screen" type displays. Each user can check the desired boxes/categories, and then click a button to create an Excel spreadsheet presenting the results of their inquiry. The user can then manipulate the data however they like for the fields selected to generate the spreadsheet.

An example spreadsheet according to an illustrative embodiment is "fresh" at the time it was generated. The user can generate updated spreadsheets over time as new AIS data is gathered. Spreadsheets can also be generated manually according to the exemplary embodiment of the disclosure. In an automated embodiment, a user may create a customized search that delivers a particular Excel spreadsheet by email hourly, daily, or weekly.

An example spreadsheet can also provide the time history of ship and cargo flow movements, allowing users to conduct historical trend analysis of global ship and cargo flow movements.

An exemplary website interface combines a Google Earth or Google Maps display with an Excel spreadsheet download interface. The Google Earth interface is illustratively provided on a top frame. The Excel spreadsheet download interface displays several groups of boxes/categories to check which are downloadable in an Excel spreadsheet.

Core data appears at the bottom of Google Earth or Google Maps display. These data are sortable by vessel or cargo type. For example, for crude oil, the data appearing at the bottom of the Google Earth or Google Maps display may include:
  Average speed of loaded crude oil tanker fleet
  Total amount of crude oil cargo in transit at sea
  Total amount of crude oil tanker tonnage in ballast (empty crude oil tankers)
  Total amount of crude oil cargo exported in last 24 hours
  Total amount of crude oil cargo imported in last 24 hours Using a drop-down menu, users can display these data fields for other vessel types, such as LNG carriers, LPG carriers, product tankers, chemical tankers, bulk tankers, iron-ore carriers, bauxite carriers, grain carriers, livestock carriers, pure car carriers, lumber carriers, cruise ships, passenger vessels, etc.

Pop-up boxes appear on the geospatial interface when users click on a country, port, vessel, or ocean basin. These data are sortable by vessel or cargo type. For example, for crude oil, pop-up boxes will provide such data as:
  Country: crude oil imports/exports—24 hours, monthly, quarterly, annually Export facility: crude oil exports—24 hours, monthly, quarterly, annually
  Import facility: crude oil imports—24 hours, monthly, quarterly, annually
  Vessel: Name, cargo capacity, latitude/longitude, course, speed, last port of call
  Ocean basin: Average speed of loaded crude oil fleet, total amount of crude oil in transit, total amount of crude oil tanker tonnage in ballast
  Market Area:
  Asian market area—NE Asia and SE Asia
  European market area
  North American market area Using a drop-down menu, users can display pop-up boxes for other vessel types.

Users can download vessel data in Excel spreadsheets. The user interface will allow users to check boxes of the data fields that they want, and then press a button to download those data in an Excel spreadsheet. Using a drop-down menu, users can sort the vessel data to download by vessel type. For example, users can download such data as the following for crude oil tankers:
- Crude oil tankers (vessel name, IMO number, MMSI number)
- Cargo capacity
- Loaded/empty/partially loaded status
- Vessel tonnage
- Current location (latitude/longitude)
- Current course
- Current speed
- Last port of call
- Destination port(s) (% of historical track record or imputed from rules-based logic)
- Average course over 24 hours, 72 hours, 7 days
- Average speed over 24 hours, 72 hours, 7 days, 15 days, 30 days, 90 days, year Average speed of loaded crude oil tanker fleet over 24 hours, 72 hours, 7 days, 15 days, 30 days, 90 days, year
- Average speed of empty crude oil tanker fleet over 24 hours, 72 hours, 7 days, 15 days, 30 days, 90 days, year
- Average speed of partially loaded crude oil tanker fleet over 24 hours, 72 hours, 7 days, 15 days, 30 days, 90 days, year
- Total amount of crude oil cargo in transit at sea
- Total amount of crude oil tanker tonnage in ballast
- Total amount of crude oil cargo exported in last 24 hours
- Total amount of crude oil cargo imported in last 24 hours The Excel spreadsheet can contain data fields for all individual crude oil tankers. It can also aggregate the data for the entire crude oil tanker fleet and subsets of the crude oil tanker fleet, such as loaded crude oil tankers, empty crude oil tankers, and partially loaded crude oil tankers. It can also aggregate or disaggregate geographically by port(s), country or countries, ocean basin(s), port pairs, country pairs, ocean basin pairs, sea route(s), and key transit points. For security purposes, the Excel spreadsheet can also remove vessel-specific information to show only the cargo movements associated with individual vessels.

Users can download cargo data in conventional spreadsheets (e.g., Excel). The user interface will allow users to check boxes of the data fields that they want, and then press a button to download those data in an Excel spreadsheet. Using a drop-down menu, users can sort the cargo data to download by cargo type, such as crude oil, or by vessel type, such as crude oil tankers. For example, users can download such data as the following for crude oil:
- Crude oil flows
- Flows of different crude oil grades
- Amount of crude oil on board each crude oil tanker
- Port of origin
- Destination port(s) (% of historical track record or imputed from rules-based logic)
- Historical record of latitude/longitude of individual crude oil movements
- Geographical location of individual crude oil movements (by ocean basin, sea route, key transit points, etc.)
- Geographical location of aggregated crude oil movements (by ocean basin, sea route, key transit points, etc.)
- Average course over 24 hours, 72 hours, 7 days
- Average speed over 24 hours, 72 hours, 7 days, 15 days, 30 days, 90 days, year
- Total amount of crude oil cargo in transit at sea
- Total amount of crude oil cargo exported in last 24 hours
- Total amount of crude oil cargo imported in last 24 hours The Excel spreadsheet can aggregate or disaggregate geographically by port(s), country or countries, ocean basin(s), port pairs, country pairs, ocean basin pairs, sea route(s), and key transit points.

Users can download port data in conventional spreadsheets (e.g., Excel). The user interface will allow users to check boxes of the data fields that they want, and then press a button to download those data in an Excel spreadsheet. Using a drop-down menu, users can sort the port data to download by port type, such as crude oil import facility, crude oil export facility, LNG import facility, LNG export facility, refined petroleum product port, chemical port, bulk port, container port, lumber port, automobile (pure car carrier) port, passenger terminal, etc. For example, users can download such data as the following for crude oil port facilities:
- Crude oil ports (port name) Export/import facility
- Geolocation (latitude/longitude) Loading/unloading capacity
- Storage capacity
- Crude oil exported/imported over last 24 hours, 72 hours, 7 days, 15 days, 30 days, 90 days, year These port data can also be aggregated and organized on the country level, the regional level, or according to a user-defined set of ports.

Users can download data organized by port pairs (e.g., vessel/argo flows from Ras Tanura, Saudi Arabia to Houston, Texas) in conventional spreadsheets (e.g., Excel). The user interface allows users to check boxes of the port pairs that they want, and then press a button to download those data in an Excel spreadsheet. Using a drop-down menu, users can sort port pair data to download by port type, such as crude oil import facility. For example, users can download such data as the following for crude oil port pairs:
- Crude oil loading-berths first column (port name)
- Crude oil offloading-berths first row (port name)
- The amount of crude oil cargo moving from export to import facilities.
- The crude oil tankers moving between export and import facilities.
- The aggregated crude oil tanker tonnage moving between export and import facilities.

These port pair data could also be aggregated and organized on the country level, which would provide users with the amount of cargo or vessel tonnage flow between two or more countries, the regional level, or between a user-defined set of ports.

Users can download data organized by ocean basin, ocean basin pairs, sea route, and key transit point in conventional spreadsheets (e.g., Excel). The user interface will allow users to check boxes of the data fields that they want, and then press a button to download those data in an Excel spreadsheet. Using a drop-down menu, users can sort the data to download by categories. The drop-down menu will also allow users to sort the data by cargo type, such as crude oil, or by vessel type, such as crude oil tankers. For example, users can download such data as the following for categories of interest:
- Individual vessel names
- Individual vessel IMO numbers or MMSI numbers Cargo capacity, by vessel and aggregated for fleet Laden/in ballast/partially full status
- Amount of crude oil on board each vessel Tonnage, by vessel and aggregated for fleet
- Current location (latitude/longitude)
- Current course
- Current speed Last port of call Destination port(s) (% of historical track record or imputed from rules-based logic)

Average course over 24 hours, 72 hours, 7 days

Average speed over 24 hours, 72 hours, 7 days, 15 days, 30 days, 90 days, year

Average speed of loaded crude oil tanker fleet over 24 hours, 72 hours, 7 days, 15 days, 30 days, 90 days, year Average speed of empty crude oil tanker fleet over 24 hours, 72 hours, 7 days, 15 days, 30 days, 90 days, year Crude oil port facilities Users can also create customized alerts for individual vessels, types of vessels, types of cargo, weather, port congestion, market data, economic data, export data, import data, world trade patterns, and other trends or events. The following list provides some examples:

Supply shock in a certain commodity

Figure 4:
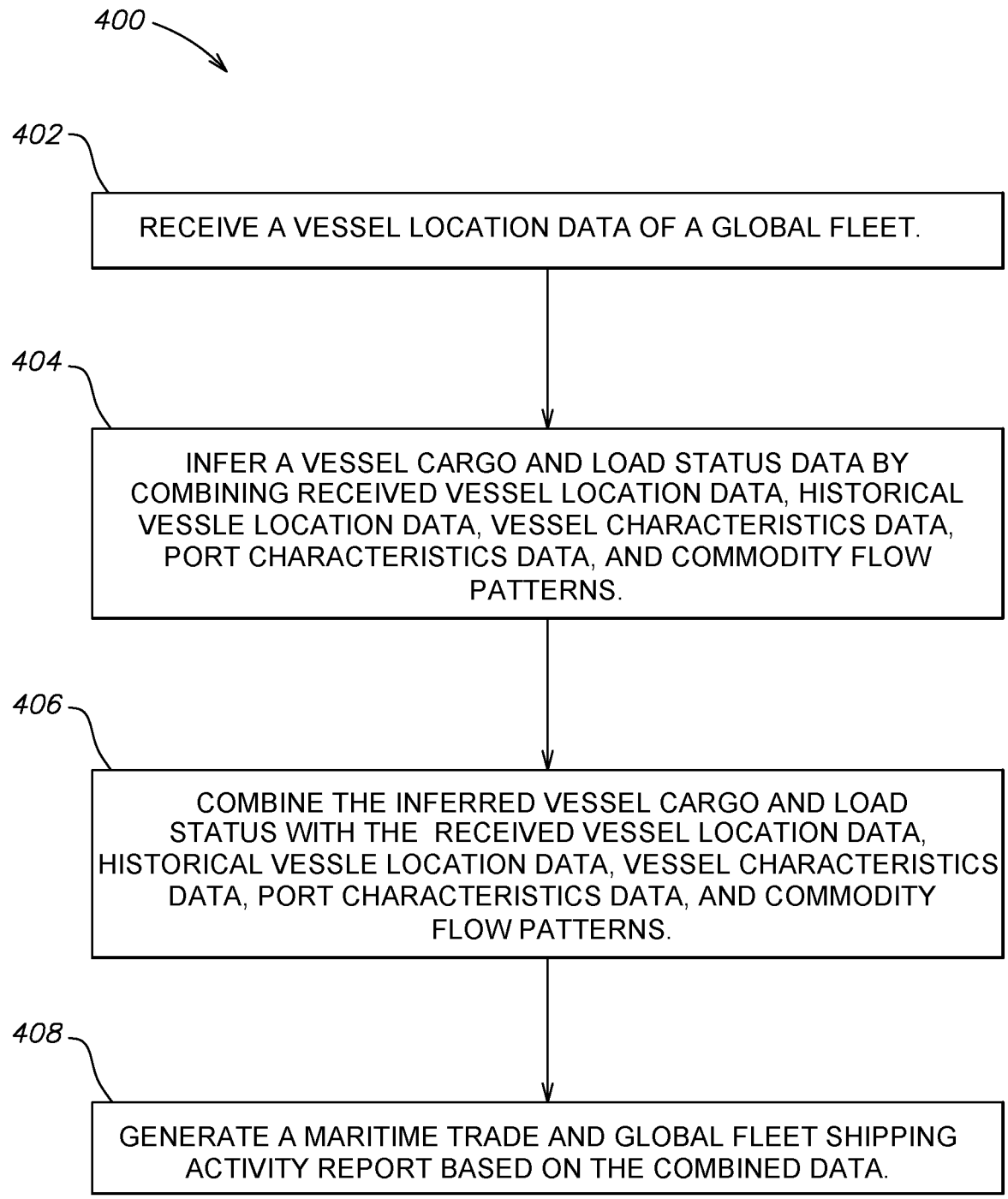
FIG. 4 is a flowchart of a method for generating a maritime trade and global fleet shipping activity report.

Deviation in expected arrival time of certain commodity flows exceeds a user-defined threshold Cargo amount of a certain commodity in a user-defined geographical area exceeds a user-defined threshold Cargo amount of a certain commodity in an ocean basin exceeds a user-defined threshold Cargo amount of a certain commodity on a sea route exceeds a user-defined threshold Cargo amount of a certain commodity passing through a key transit point exceeds a user-defined threshold Deviation in expected arrival time of a vessel exceeds a user-defined threshold Vessel turns around Vessel makes significant deviation in current course Vessel makes significant speed change Vessel anchors in a harbor to engage in floating storage Vessel engaged in floating storage starts moving to market Port arrival by certain type of vessel Port departure by certain type of vessel World trade increases or falls by X % over a user-defined time period Trade from a user-defined local, state, national, regional, or international geographic area increases or falls by X % over a user-defined time period Exports from a user-defined local, state, national, regional, or international geographic area increases or falls by X % over a user-defined time period Imports from a user-defined local, state, national, regional, or international geographic area increases or falls by X % over a user-defined time period FIG. 4 depicts a method for generating trade and shipping activity reports (400). Data is received providing vessel locations of a global fleet of vessels (402). The global fleet data may be provided by satellite 104, ground based receiver 103, or transmitted by the global fleet, or any other combination or multiplicity of these sources. Generally, a data center 106 may receive the data and perform the remaining operations.

The received vessel location data is then used to infer a vessel's cargo contents and load (e.g., loaded or empty) status by combining the location data with historical vessel location data, vessel characteristics, port characteristics, and commodity flow patterns (404). As discussed above, the vessel's cargo contents, load status, and commodity flow patterns can be discerned in multiple ways, including, without limitation, using rules-based logic or Bayesian logic, neural networks, learning algorithms, other mathematical methods, direct inquiry to owners, shippers or port personnel or by historic data or additional contextual or inferential data. Cargo contents, load status, commodity flow patterns, historical vessel location data, port characteristics, vessel characteristics can also be retrieved from ancillary databases 109 or vessel databases 110.

The inferred cargo and load data may then be combined with the received vessel location data, historical vessel location data, and physical characteristics of the vessel and port physical characteristics to yield combined data (406). The combined data is then used to generate a report detailing either maritime trade or global fleet shipping activity (408). The generated report may be received by a server such as data center 112 to be provided to users upon request or may be generated for, and delivered to, a single user. A global strategic picture (GSP) processor 308 may perform the combining operation 406 and deliver the data output to a presentation processor 312 for report generation operation 408.

In some embodiments, method 400 may be performed periodically and thereby generate periodic logs. These periodic logs may be combined with user defined data in order to generate a report for a specific subset of vessels of the global fleet. In various other embodiments, this generated user defined report may further be used over a user specified period of time to generate trend data for a subset of the fleet. The user specified trend may be output to user applications such as commodity view applications 313, government and security applications 314, or fleet management applications 315.

In some embodiments, the inferred cargo and load status of operation 404 can be provided independently and along with the generated report of operation 408. The cargo data may be provided as a quantity of cargo and the report may be provided as quantified data.

Figure 5:
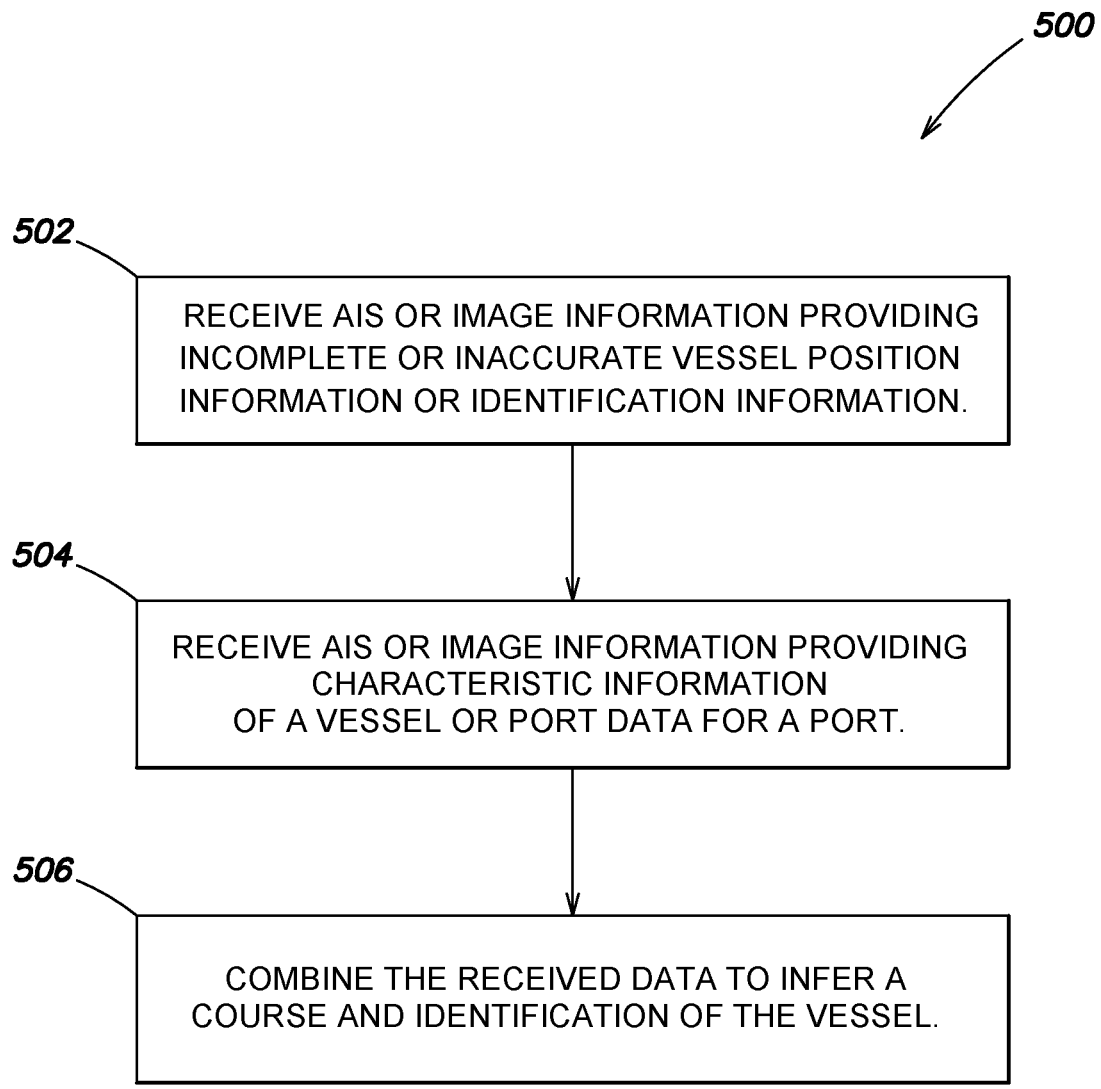
FIG. 5 is a flowchart of a method for inferring a course and identification for a vessel.

FIG. 5 depicts a method for determining a course or identification of a vessel from incomplete or inaccurate position or identification information (500). Incomplete or inaccurate vessel position or vessel identification information is received (502). The incomplete or inaccurate vessel position information can be received from an automatic ship identification system (AIS), an image of the vessel, radar data, or a combination of AIS and image data. The incomplete or inaccurate vessel identification information may include any or a combination of a vessel type, name, identification number, status, size, or capacity.

Port information describing a port is also received (504). The port information can include any or a combination of a port operational status, position, capacity, size, draft restriction, handled cargos, and berth information. Berth information can include any or a combination of total number and location of berths, and cargos handled by the berths. Any physical characteristic of a port can be port information.

The received vessel position and/or identification information may then be combined with the received information on vessel type, name, identification number, status, size, or capacity in order to infer a course or identification of the vessel (506). In some embodiments, weather information from, for example, a weather database may also be combined with the vessel position and/or identification information to infer a course or direction of the vessel.

In some embodiments, the vessel position may be tracked over a period of time to provide historical vessel position data. In some embodiments, port information can be tracked over a period of time as well or instead in order to provide historical port information. In other embodiments, historical vessel information and historical vessel data may be used to infer load and cargo information as well as an origin and destination of the vessel. By doing this to multiple vessels, vessel quantity and aggregated cargo can be determined as well.

In some embodiments, the method 500 may be performed on a plurality of vessels to quantify information on a plurality of vessels or a fleet. Further, the quantified information on the fleet may be combined with known vessel patterns to generate a quantification of the shipping activity of the fleet.

In some embodiments, vessel position, speed, course, fleet average speed, port of origin, destination port, or time at port may be combined with known vessel patterns to generate a quantification of shipping activity of a fleet of vessels. Fleet shipping activity can include, without limitation, ships entering and/or leaving geographical areas such as those associated with a port or country, moving along sea routes, and/or idling.

Figure 6:
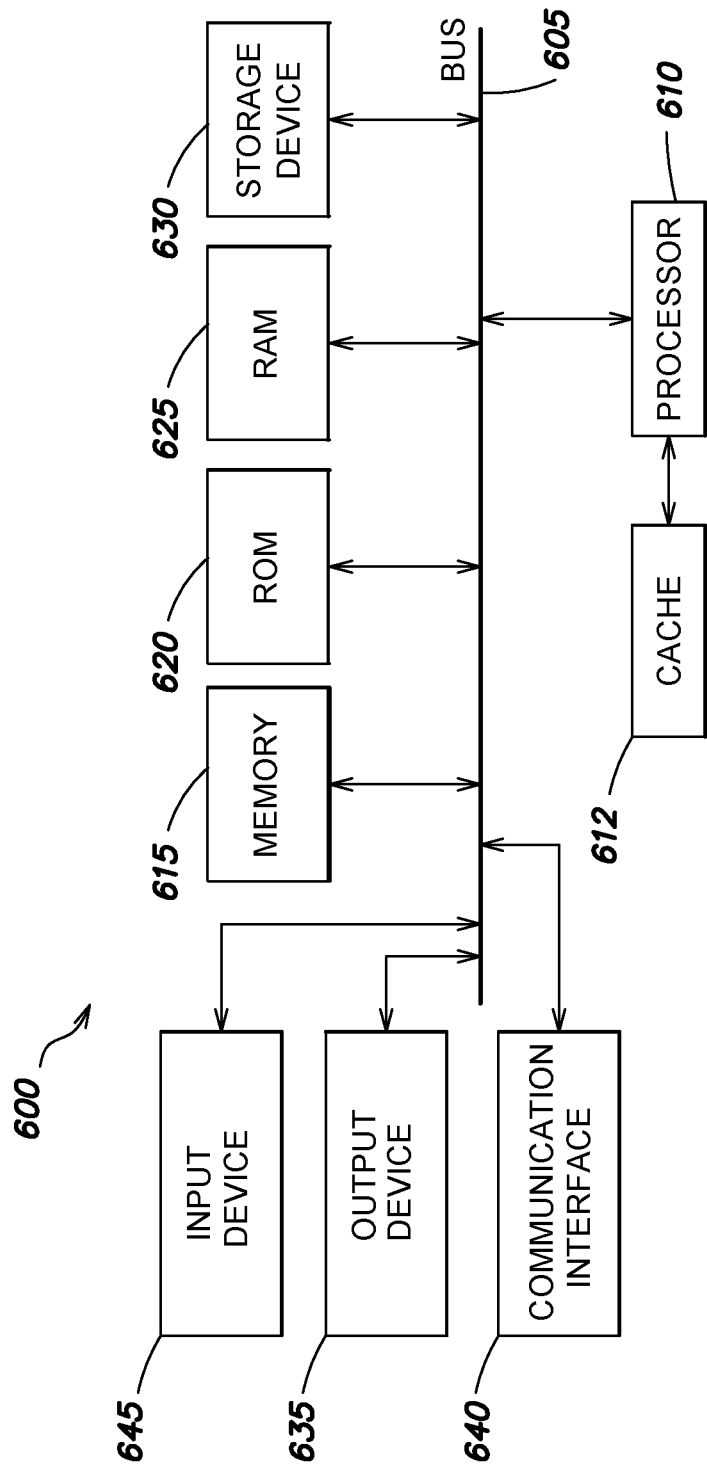
FIG. 6 is a system diagram of an example computing system that may implement various systems and methods discussed herein, in accordance with various embodiments of the subject technology.

A general example system shall be disclosed in FIG. 6 which can provide some basic hardware components making up a server, node or other computer system. FIG. 6 illustrates a computing system architecture 600 wherein the components of the system are in electrical communication with each other using a connector 605. Exemplary system 600 includes a processing unit (CPU or processor) 610 and a system connector 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules/services can control or be configured to control the processor 610 to perform various actions. Other system memory 615 may be available for use as well. The memory 615 can include multiple different types of memory with different performance characteristics. The processor 610 can include any general purpose processor and a hardware module or software module/service configured to control the processor 610 as well as a special-purpose processor where software instructions are incorporated into the actual processor design. The processor 610 may essentially be a completely self-contained computing system, containing multiple cores or processors, a bus (connector), memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software services for controlling the processor 610. Other hardware or software modules/services are contemplated. The storage device 630 can be connected to the system connector 605. In one aspect, a hardware module that performs a particular function can include the software component stored in a computer-readable medium in connection with the necessary hardware components, such as the processor 610, connector 605, display 635, and so forth, to carry out the function. A computer-readable medium or computer-readable storage device are non-transitory devices and do not encompass the air interface or a signal per se.

Figure 7:
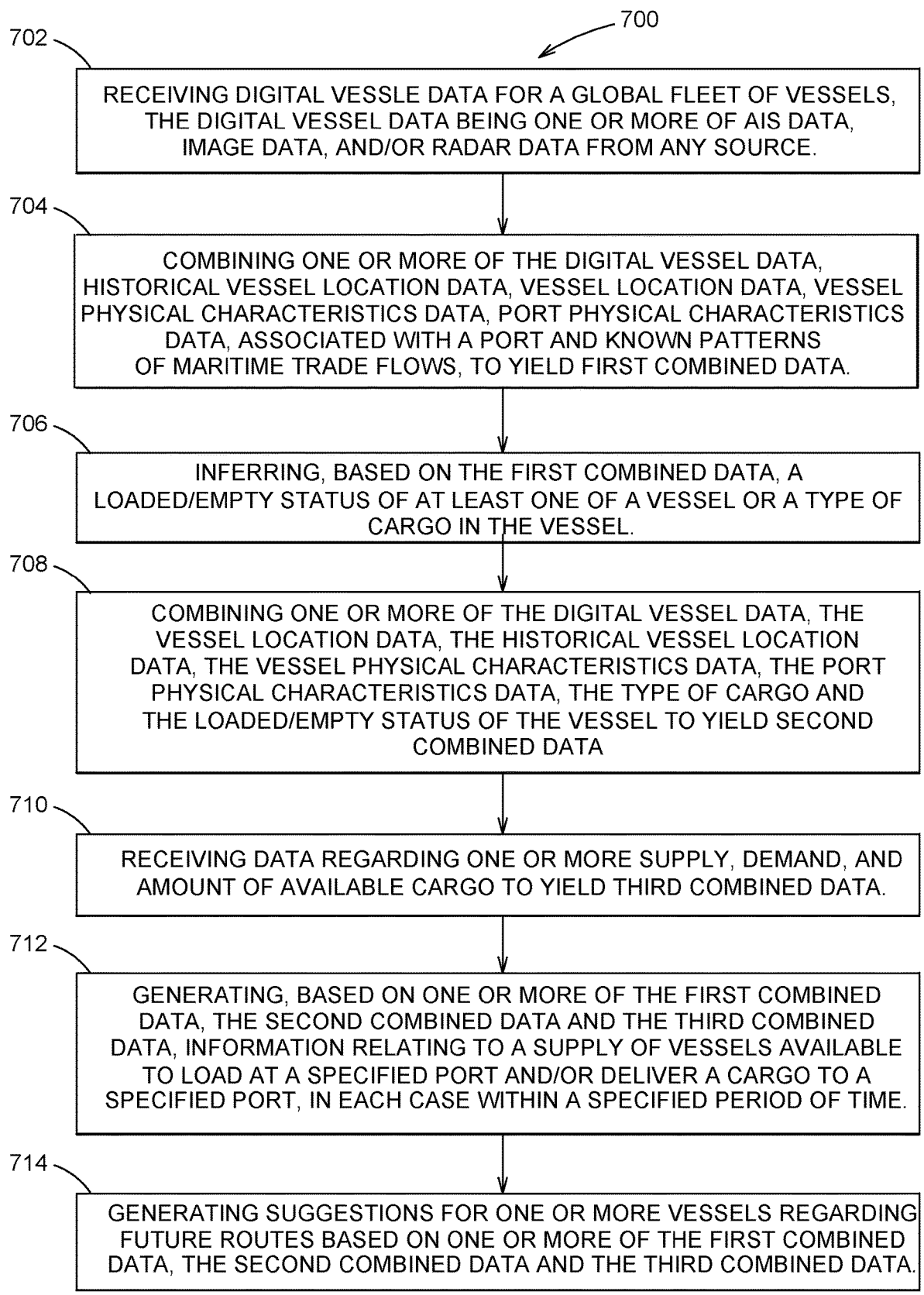
FIG. 7 illustrates a method example for generating suggestions regarding future routes.

Another aspect of this disclosure relates to vessel routing management. This can refer to any type of vessels including boats, trucks, trains, helicopters, drones, airplanes, and so forth. In one aspect, a method 700, disclosed in FIG. 7, includes receiving digital vessel data for a global fleet of vessels, the digital vessel data being retrieved at least in part from one or more of AIS data, image data and/or radar data, received from one or more sources such as satellite, a ground based receiver or data transmitted by respective vessels of the global fleet of vessels (or other source) (702), combining, via a processor, one or more of the digital vessel data, historical vessel location data, vessel location data, vessel physical characteristics data, port physical characteristics data associated with a port and known patterns of maritime trade flows, to yield first combined data (704) and inferring, based on the first combined data, a loaded/empty status of at least one of a vessel or a type of cargo in the vessel (706). The inferring can also be more granular in that it can involve inferring the particular level of cargo within the vessel. For example, the step can infer that the vessel is 60% loaded. Thus, the loaded/empty status does not necessarily mean inferring that the vessel is fully loaded or fully empty. The vessel data can also include reconstructed data associated with any message delivered from a vessel.

The method can further include combining, via the processor, one or more of the digital vessel data, the vessel location data, the historical vessel location data, the vessel physical characteristics data, the port physical characteristics data, the type of cargo and the loaded/empty status of the vessel to yield second combined data (708), receiving data regarding one or more of supply, demand, and amount of available cargo to yield third combined data (710), generating, based on one or more of the first combined data, the second combined data and the third combined data, information relating to a supply of vessels available to load at a specified port and/or deliver a cargo to a specified port, in each case within a specified period of time (712) and generating suggestions for one or more vessels regarding future routes based on one or more of the first combined data, the second combined data and the third combined data (714).

The method can further include inferring the loaded/empty status of a plurality of vessels. The digital vessel data can include any combination of the data such as two or more of AIS data, image data, radar data, and/or reconstructed message data, from any source such as satellite, ground-based receiver, or data transmitted by the global fleet of vessels. Any combination of these various data types can be used for inferring the status of a vessel or vessels. It is also noted that where port characteristics might be used, the vessel or vessels in that scenario would likely be boats or other water bound vessels. However, where such port information is not part of the process, any kind of vessel is disclosed herein could be the subject of a particular claim.

The first combined data can include any combination of the data such as a combination of two or more of the digital vessel data, the historical vessel location data, the vessel location data, the vessel physical characteristics data, the port physical characteristics data and the known patterns of maritime trade flows.

The port physical characteristics data, when part of the analysis, can include one or more of an operational status of the port, a position of the port, a capacity of the port, a size of the port, a number of berths within the port, a location of the berths within the port, draft restrictions at the port, cargo handled by the port, cargo handled at respective berths within the port, and/or any other physical characteristics of the port such as machinery available for loading commodities.

The radar data can include a radar image of the vessel. The radar data can come from other vessels such as radar data from other boats or ground-based radar detection systems, which can identify trucks, trains, drones, helicopters, airplanes, or any other vessel.

Figure 8:
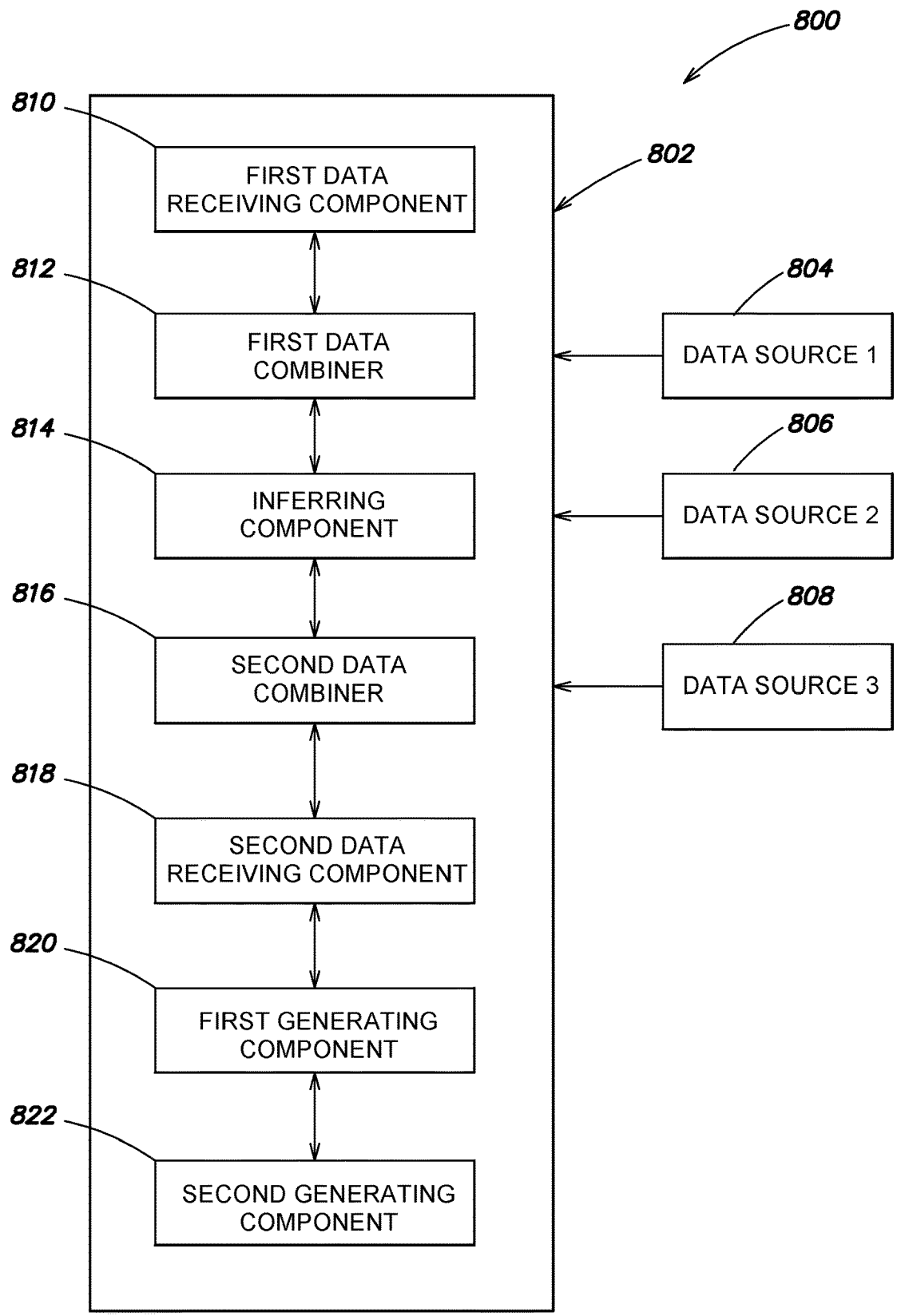
FIG. 8 illustrates a system example with various components that work to receive data and process data to arrive at an inference of a loaded or empty or other status of a vessel.

In another aspect, the system can include a variety of different components that provide a nonconventional combination of components for performing the steps disclosed herein. For example, the system 802, shown in the configuration 800 of FIG. 8, can include a first data receiving component 810 configured to receive digital vessel data 804, 806, 808, for a global fleet of vessels, the digital vessel data being at least one or more of AIS data, image data and/or radar data, retrieved from one or more of a ground based receiver, a satellite, or data transmitted by respective vessels of the global fleet of vessels, a first data combiner 812 configured to combine, via a processor, one or more of the digital vessel data, historical vessel location data, vessel location data, vessel physical characteristics data, port physical characteristics data associated with a port and known patterns of maritime trade flows, to yield first combined data and an inferring component 814 configured to infer, based on the first combined data, a loaded/empty status of at least one of a vessel or a type of cargo in the vessel.

The system 802 can also include a second data combiner 816 configured to combine, via the processor, one or more of the digital vessel data, the vessel location data, the historical vessel location data, the vessel physical characteristics data, the port physical characteristics data, the type of cargo and the loaded/empty status of the vessel to yield second combined data, a second data receiving component 818 configured to receive data 804, 806, 808 regarding one or more of supply, demand, and amount of available cargo to yield third combined data and a first generating component 820 configured to generate, based on one or more of the first combined data, the second combined data and the third combined data, information relating to a supply of vessels available to load at a specified port and/or deliver a cargo to a specified port, in each case within a specified period of time. The system 802 can also include a second generating component 822 configured to generate suggestions for one or more vessels regarding future routes based on one or more of the first combined data, the second combined data and the third combined data. The data sources 804, 806, 808 can represent any data source described herein.

The concepts and applications disclosed herein can include determining a vessel position using image data. Photographs, surveillance images, satellite images, radar images from a ground source, other vessels, or a satellite, can be used individually or in any combination with other data to determine a location of a vessel such as a truck, train, helicopter, drone, or boat as well as a stock level, inventory level, loaded level or status of the vessel, and so forth.

Additionally, using the vessel position, cargo data, and, where applicable, port data can be utilized in the efficient management of shipping vessels. For example, the algorithms and systems disclosed herein can address the long-standing problem of how to optimize a fleet of vessels given supply, demand, location of the vessels, amount of available product, and so forth. An example will illustrate the point. Assume that a vessel owner, in this example, the vessel is a ship, has an offer to ship goods across the sea from this place to that place from a first entity for $12,000 a day. Assume the vessel owner has a second offer from a second entity to ship goods for $15,000 a day. While on the surface it may be obvious to take the higher offer, using the principles disclosed herein, the system can optimize or improve the use of vessel used utilization. While a vessel owner will make more money when they receive a higher compensation for moving cargo, freight rates are volatile and using the vessel position information together with information about vessels, ports, stock levels, and so forth, the system can determine an improved cargo and route for a vessel. For example, the system can provide information to the vessel owner that if they take the $12,000 per day contract, they will be able to spend more days in route, and at their destination port can pick up cargo for a return trip at $20,000 per day rather than returning empty if they take the $15,000 per day contract. This optimization can be pursued on a voyage by voyage basis or across a portfolio of vessels or a fleet of vessels. By utilizing the system disclosed herein, the evaluation can include the next potential leg of shipping and all of the associated types of cargo, cost, distance, destinations, and so forth. The system can also evaluate the following leg after that and beyond. In other words, the recommendation or suggestion to take the $12,000 per day cargo could be based on the timing and positioning of one or more additional potential shipments which can increase the profits of the shipping entity and the efficiency of the cargo distribution on a more global basis. In this manner, the system can optimize the value of a fleet in terms of its overall efficiency and profitability. By providing a broader overview of cargo movements, costs, and so forth, the system can also forecast freight rates by using vessel location information, information about the vessels and ports, and any data or communication data disclosed herein to forecast freight rates and to use the forecasted freight rates to determine optimal vessel utilization, routes, timing, scheduling, and so forth.

In one example, the system may know that three vessels that can ship cars are all headed to a similar port in Japan. Knowing this data can provide an opportunity for the system to forecast the rate for shipping a group of vehicles from Japan to America given the potential for competition. Any of the data or any combination of data disclosed herein can be utilized to determine the market forces that might be at play with respect to supply and demand on a granular basis such that more accurate forecasts of shipping costs, the availability of vessels, amounts of inventory, and so forth which can all go into play with respect to a particular negotiated cost for shipping cargo, on a particular vessel to a particular location.

For rail freight, the disclosure uses information about a type of freight car, such as a hopper or a container, the location of the train on a railway, information about the shipper and destination, characteristics of train stations and loading stations such as the type of cargo that is or can be loaded at a particular location (such is the difference between coal and cars), the types of factories and warehouses that are near a particular loading location, information about railway networks and the trade of real cargo, the volume of real activity, and so forth. This is particularly of interest with respect to bulk commodities. Accordingly, all of the concepts disclosed herein with respect to boats, ports, and so forth can also be applicable to rail freight in principle. Any one or more of these data points can be combined to analyze the data and infer a loaded or empty status of the train, the type of cargo, supply, demand, and so forth.

With respect to truck freight, the information that can be used can include information about the types of trucks, the location and movement of trucks, ports or loading dock characteristics, and manufacturing locations as well as other manufacturing facilities and retail distribution centers and their characteristics, including physical characteristics such as the number of loading docks, the height of loading docks, the size of warehouse or distribution center, and so forth. The system can enable the planning for the most efficient use of truck fleets with the goal of optimal use or preferred use of trucks via the reduction of wait time and empty miles. The system can enable the matching of cargo with available trucks and provide information about tracking networks or utilize information about trucking networks to make recommendations or decisions as a result of the algorithms. Any of the principles disclosed herein with respect to boats in the analysis with respect to inferring cargo routing and other data with respect to global cargo distribution via boat can be also applicable to truck freight as well.

In another aspect, the disclosure can also be viewed from the standpoint of a superset network which receives and processes information about a trade network that includes maritime, rail and truck components on an integrated flow of product or commodities. Thus, while the processes can be implemented on an individual vessel type basis, the overall process can also include application to cargo as it is transferred across different types of vessels from its origination or generation to its final destination at a retail store, a home, a warehouse, or whatever final destination.

A superset network can include a digital map of current and historical trade network activity and monitoring of the trade activity on a superset basis. The monitoring can relate to the supply and demand of trade. Machine to Machine (M2M) communication can also be tapped and provided to the system for analysis. For example, such communications be used for the tracking of ships, trains, helicopters, trucks, construction equipment, mining equipment, farming combines, tractors, cell phones, EZ Pass data, radar data, AIS data, drones, helicopters, cars, and any other similar type of data can be used, to generate a digital footprint created from information obtained from such digital sensors between machines. Any one or more of these types of data can be provided to the system in order to create the digital footprint identification of a vessel, its movement, its status, and so forth can be utilized ultimately infer information.

For example, with farm equipment, the system could retrieve radar data, image data, AIS data (for land-based equipment), any visual data, infrared signature data, and/or any other kind of data to determine patterns of farm combines or any other farm equipment to determine timing of planting, harvesting and delivery to the marketplace. Volume and expected yield can be determined based on a speed of farm equipment as they move through a field or a timing of processing of crops relative to weather patterns and weather conditions. Like ships, farm equipment can be equipped with message delivery systems which can provide the machine to machine communication and enable a tracking of their motion for activity. This data can then be analyzed by the system in order to predict commodity movement, volume of crop harvests, type of crop, through the entire infrastructure or to infer certain characteristics associated with that particular commodity. The data cannot only include processing of existing crop, but also track the seating operation as well which can also be used to predict a harvesting time and/or volume. A crop type could also be inferred as well. Based on any of this data. In another aspect, the system can provide a mechanism for individual farmers to submit their own information to a user interface to report on what crops they are planting or harvesting. Thus, the system disclosed herein can provide an overall view of commodities or any product from the very beginning of the creation of the product or commodity through the process of delivering the product or commodity to its final destination through all sorts of delivery mechanisms.

In one aspect, this disclosure involves the use of temporal information to connect such messages, or such communications. For example, their tips different types of messages broadcast by vessels in separate transmissions. These can be AIS messages or other types of messages such as position information messages. These messages can be transmitted periodically and completely independent of each other. In other words, they do not necessarily get transmitted together. These messages can be picked up by satellite, other vessels, boats, or any antenna that can receive the message. It is often the case that one wants to associate one type of AIS message to another type and ultimately to a vessel. This approach can be challenging as the AIS messages are sometimes mangled, corrupted or intentionally changed. Each message should include an MMSI (maritime mobile service identity) which is an identification number for the transmitting vessel. Where the MMSI number is mangled or not readable, users will typically just discard the message as not useful and wait for the next one.

Part of this disclosure is to evaluate temporally these messages and to determine a temporal correlation between the time series of different messages and the use of temporal information to associate a method of message with each other and with vessels. For example, the system could use any one or more of port data, radar data, image data, AIS data, any message data from any source such as a satellite and so forth which can be used to infer or specifically identify a specific location of a vessel at a particular time. Where the system might receive a mangled, corrupted or intentionally changed message at a particular time, the system can correlate the time of that message or messages and be able to infer or fill in some of the missing information, such as a transmitting vessel, based on the other data known about vessels which relate to or appear to be at the location of the transmitting vessel. In order to identify the temporal data associate with the message, the system needs to evaluate the time that the system received the message as well as the path traveled by that message. For example, if the message was received by a satellite and then forwarded to the system for evaluation, then an analysis can be made to predict or infer when the message was actually transmitted and from what vessel. The inference of the transmission time from the vessel of the message can be correlated with vessel position and timing information to associate a particular message with the vessel and/or with other potential messages from the vessel. For example, if a mangled message can be correlated with other messages, then data within that message that was not retrieved can be inferred with confidence.

Figure 9:
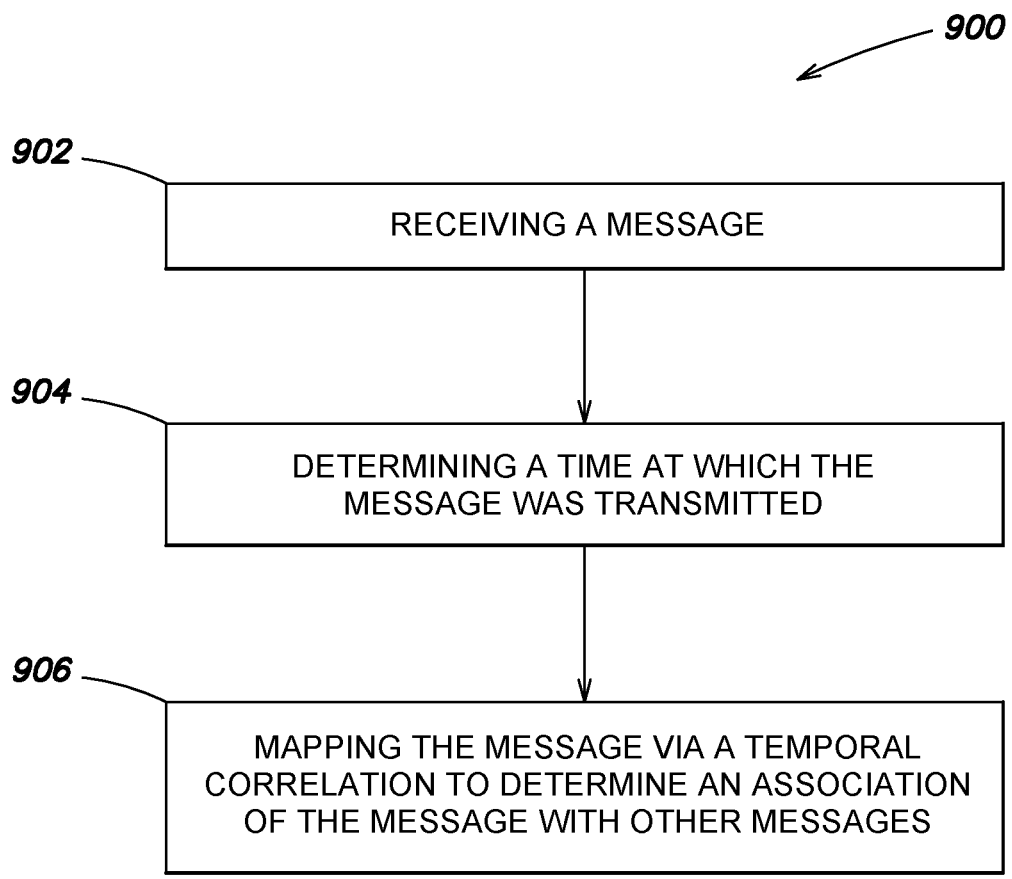
FIG. 9 illustrates a method of handling mangled, incomplete, or inaccurate messages, such as MMSI messages, to retrieve missing data.

A method with respect to handling M2M messages his disclosed in FIG. 9. The method includes receiving a message (902), determining a time at which the message was transmitted (904), and mapping the message via a temporal correlation to determine an association of the message with other messages (906). For example, assume a vessel is periodically transmitting different messages about its location and its identification. Some messages are received via a land-based antenna and others are received via satellite. Where some of these messages might be mangled and essentially unreadable on an individual basis, the method disclosed herein can receive the various messages, evaluate the transmission path, and any other data associated with the message and map the message into a temporal correlation with other messages. In this manner, where the system might receive a clean message which properly identifies a vessel and its location and then a series of mangled messages which are unreadable, using a temporal correlation between these messages, the system can either positively identify or infer with a certain threshold of confidence that other messages were transmitted by the same vessel from a particular location or along a predicted path. This analysis enables the replacement or filling in of gaps of data from messages that might otherwise be discarded and useless. Depending on the confidence level of the messages, the data associated with the messages can be forwarded to other analyses or components which can include the data in an evaluation of shipping operations, and any other conclusions or infer data disclosed herein.

The analysis of course could also involve simply a single message. The system can receive a single message, identify or predict the temporal component of the message which identifies when it was likely transmitted. Given the location of the receiving antenna, whether a satellite or an earthbound station, the system could also correlate the timing and general location of the transmitting vessel with other data that identifies vessels and their likely locations to fill in the missing gaps associated with that message. The message may have traveled over several different networks and through several different nodes to arrive at the system for evaluation. Thus, the temporal analysis can include an indication of travel times across the various network components, delay factors, buffering factors, weather factors, and so forth, to ultimately predict a timing of when the message was transmitted from the transmitting vessel. Thus, if the MMSI data is not readable and the message, or only partially readable, and the other analysis identifies that a particular vessel is likely to have been in the vicinity of the vessel that transmitted the message, the system can identify a correlation between that particular vessel and the MMSI data to arrive at a positive identification of the vessel at a certain level of certainty.

Therefore, the above analysis and processes enable the system to handle mangled, incomplete or inaccurate data in a novel way to create new data or to infer or fill in the gaps of the missing data associated with these types of messages. Rather than merely discarding such a message as useless, the system can perform a temporal analysis, predict when the message was sent, utilize all the other data disclosed herein, or any component of the other data, and turn a previously mangled and useless message into a potentially valuable message. The final result may be a completely deciphered message or may be only partially deciphered message, but with sufficient information to be valuable, such as the vessel name or vessel position. Different portions of the message may be deciphered or determine the different thresholds of confidence and the particular structure and confidence levels of the resulting message can then be provided to other components to include in a larger analysis of shipping operations.

Figure 10:
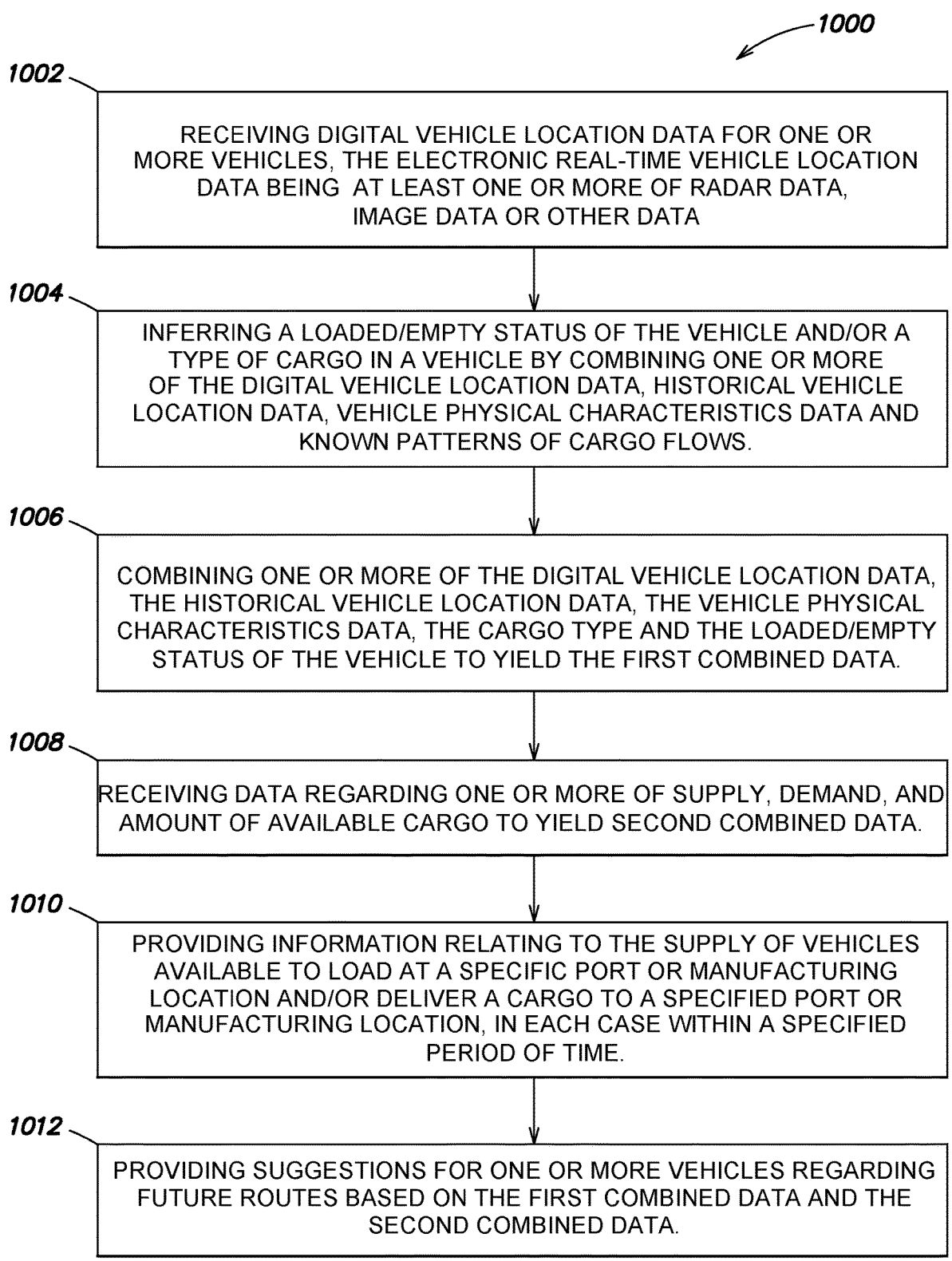
FIG. 10 illustrates a method of inferring a status of a vessel, cargo type, or other data about a vessel.

The disclosure now turns to various examples of the system and methods disclosed herein. The first relates a vessel, truck, train, drone, and airplane routing concept. This is shown in FIG. 10, a method includes receiving digital vehicle location data for one or more vehicles, the electronic real-time vehicle location data being at least one or more of image data, infrared data and/or radar data (or other data) retrieved from one or more of a ground based receiver or data transmitted by the vehicle (1002), inferring a loaded/empty status of the vehicle and/or a cargo type of cargo in a vehicle by combining, via a processor, one or more of the digital vehicle location data, historical vehicle location data, vehicle physical characteristics data and known patterns of cargo flows (1004), combining, via a processor, one or more of the digital vehicle location data, the historical vehicle location data, the vehicle physical characteristics data, the cargo type and the loaded/empty status of the vehicle to yield first combined data (1006), receiving data regarding one or more of supply, demand, and amount of available cargo to yield second combined data (1008) and providing information relating to the supply of vehicles available to load at a specified port or manufacturing location and/or deliver a cargo to a specified port or manufacturing location, in each case within a specified period of time (1010), and providing suggestions for one or more vehicles regarding future routes based on the first combined data and the second combined data (1012).

Figure 11:
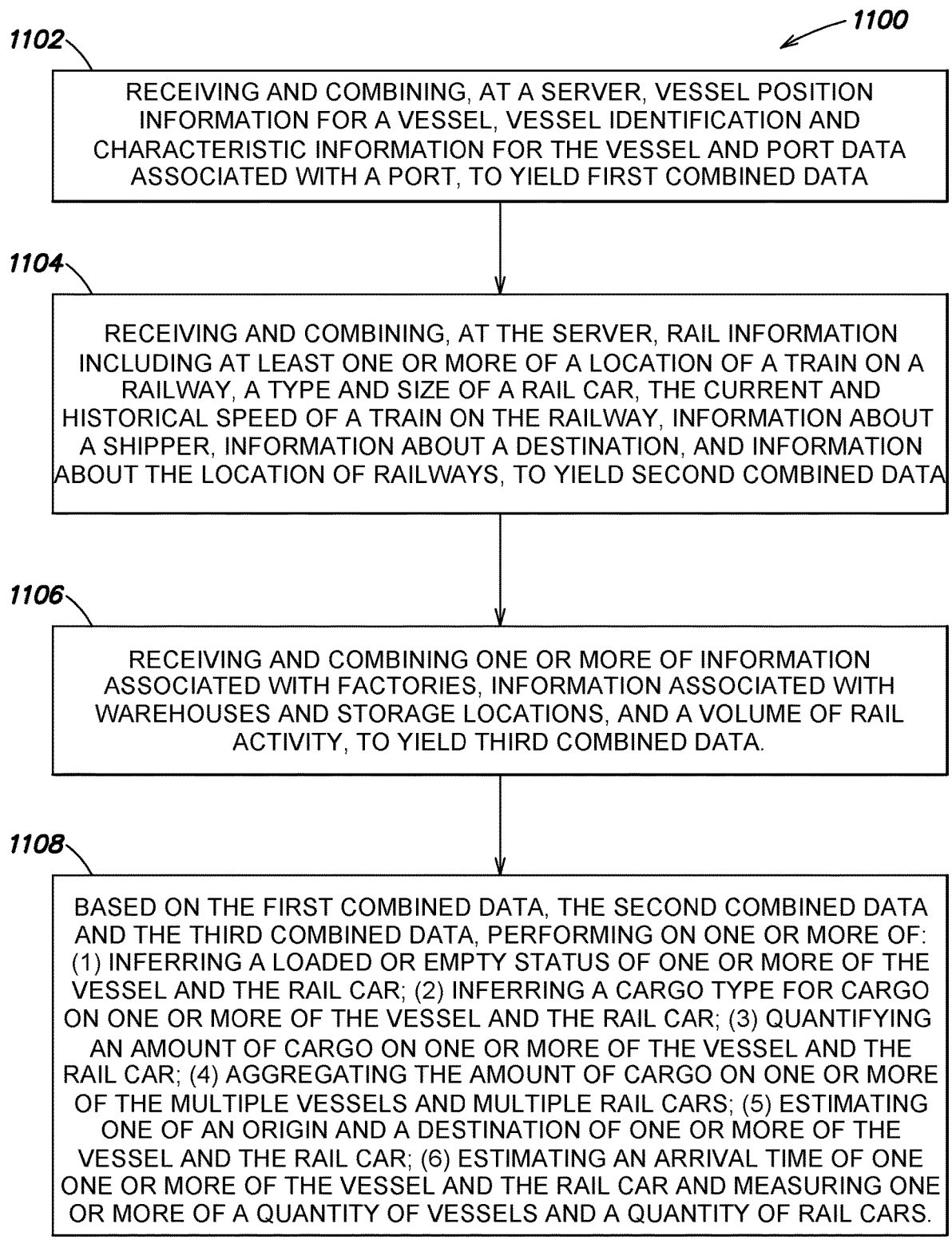
FIG. 11 illustrates another method of inferring a status of a vessel, cargo type, or other data about a vessel.

Another example method relates to vessels and rail applications. An example method is shown in FIG. 11. A method includes receiving and combining, at a server, vessel position information for a vessel, vessel identification and characteristic information for the vessel and port data associated with a port, to yield first combined data (1102). The vessel position information for the vessel is determined from at least one of an automatic identification system (AIS) message (or any other message) from the vessel and an image of the vessel, which can be a picture, infrared, radar or other. The vessel identification and characteristic information for the vessel can include at least one of a vessel type of the vessel, a name of the vessel, a number associated with the vessel, a status of the vessel, a size of the vessel, and a capacity of the vessel. The port data associated with the port can include at least one of an operational status of the port, a position of the port, a capacity of the port, a size of the port, a number and location of berths within a port, draft restrictions at the port, cargos handled by the port, and cargos handled by the berths within the port.

The method includes receiving and combining, at the server, rail information including at least one of more of a location of a train on a railway, a type and size of a rail car, the current and historical speed of a train on the railway, information about a shipper, information about a destination, and information about the location of railways, to yield second combined data (1104), and receiving and combining one or more of information associated with factories, information associated with warehouses and storage locations, and a volume of rail activity, to yield third combined data (1106). Based on the first combined data, the second combined data and the third combined data, the method includes performing on or more of: (1) inferring a loaded or empty status of one or more of the vessel and the rail car; (2) inferring a cargo type for cargo on one or more of the vessel and the rail car; (3) quantifying an amount of cargo on one or more of the vessel and the rail car; (4) aggregating the amount of cargo on one or more of multiple vessels and multiple rail cars; (5) estimating one of an origin and a destination of one or more of the vessel and the rail car; (6) estimating an arrival time of one or more of the vessel and the rail car and measuring one or more of a quantity of vessels and a quantity of rail cars (7) (1108).

Figure 12:
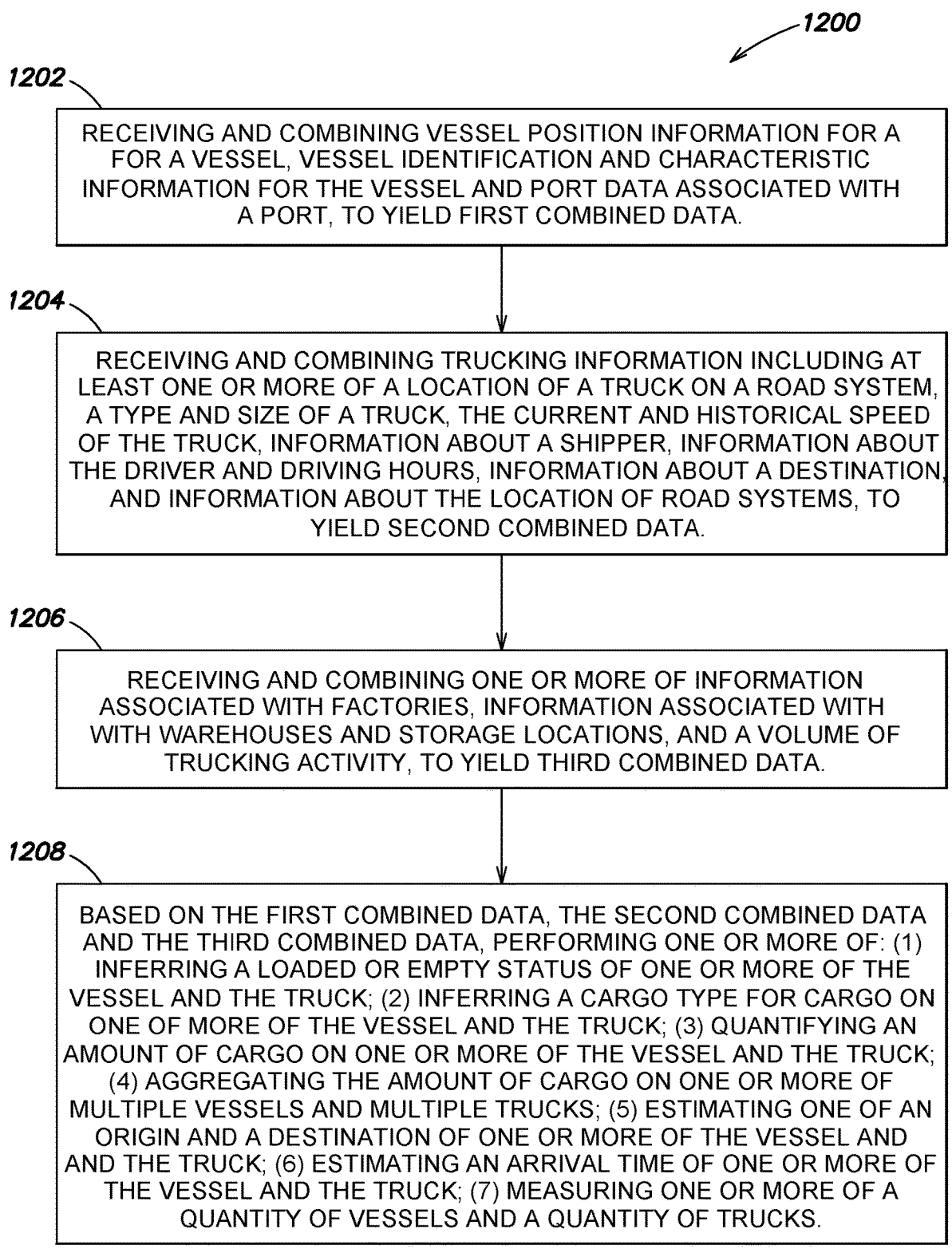
FIG. 12 illustrates another method of inferring a status of a vessel, cargo type, or other data about a vessel.

FIG. 12 illustrates an example method relates to vessels and trucking. A method includes receiving and combining, at a server, vessel position information for a vessel, vessel identification and characteristic information for the vessel and port data associated with a port, to yield first combined data (1202). The vessel position information for the vessel is determined from at least one of an automatic identification system (AIS) message (or any other message) from the vessel and an image of the vessel, which can be a picture, infrared, radar or other. The vessel identification and characteristic information for the vessel can include at least one of a vessel type of the vessel, a name of the vessel, a number associated with the vessel, a status of the vessel, a size of the vessel, and a capacity of the vessel. The port data associated with the port can include at least one of an operational status of the port, a position of the port, a capacity of the port, a size of the port, a number and location of berths within a port, draft restrictions at the port, cargos handled by the port, and cargos handled by the berths within the port.

The method includes receiving and combining, at the server, trucking information including at least one of more of a location of a truck on a road system, a type and size of a truck, the current and historical speed of the truck, information about a shipper, information about the driver and driving hours, information about a destination, and information about the location of road systems, to yield second combined data (1204) and receiving and combining one or more of information associated with factories, information associated with warehouses and storage locations, and a volume of trucking activity, to yield third combined data (1206). The volume of trucking activity can include coverage of trucking traffic or movement. The method includes, based on the first combined data, the second combined data and the third combined data, performing one or more of: (1) inferring a loaded or empty status of one or more of the vessel and the truck; (2) inferring a cargo type for cargo on one or more of the vessel and the truck; (3) quantifying an amount of cargo on one or more of the vessel and the truck; (4) aggregating the amount of cargo on one or more of multiple vessels and multiple trucks; (5) estimating one of an origin and a destination of one or more of the vessel and the truck; (6) estimating an arrival time of one or more of the vessel and the truck; and (7) measuring one or more of a quantity of vessels and a quantity of trucks (1208).

Figure 13:
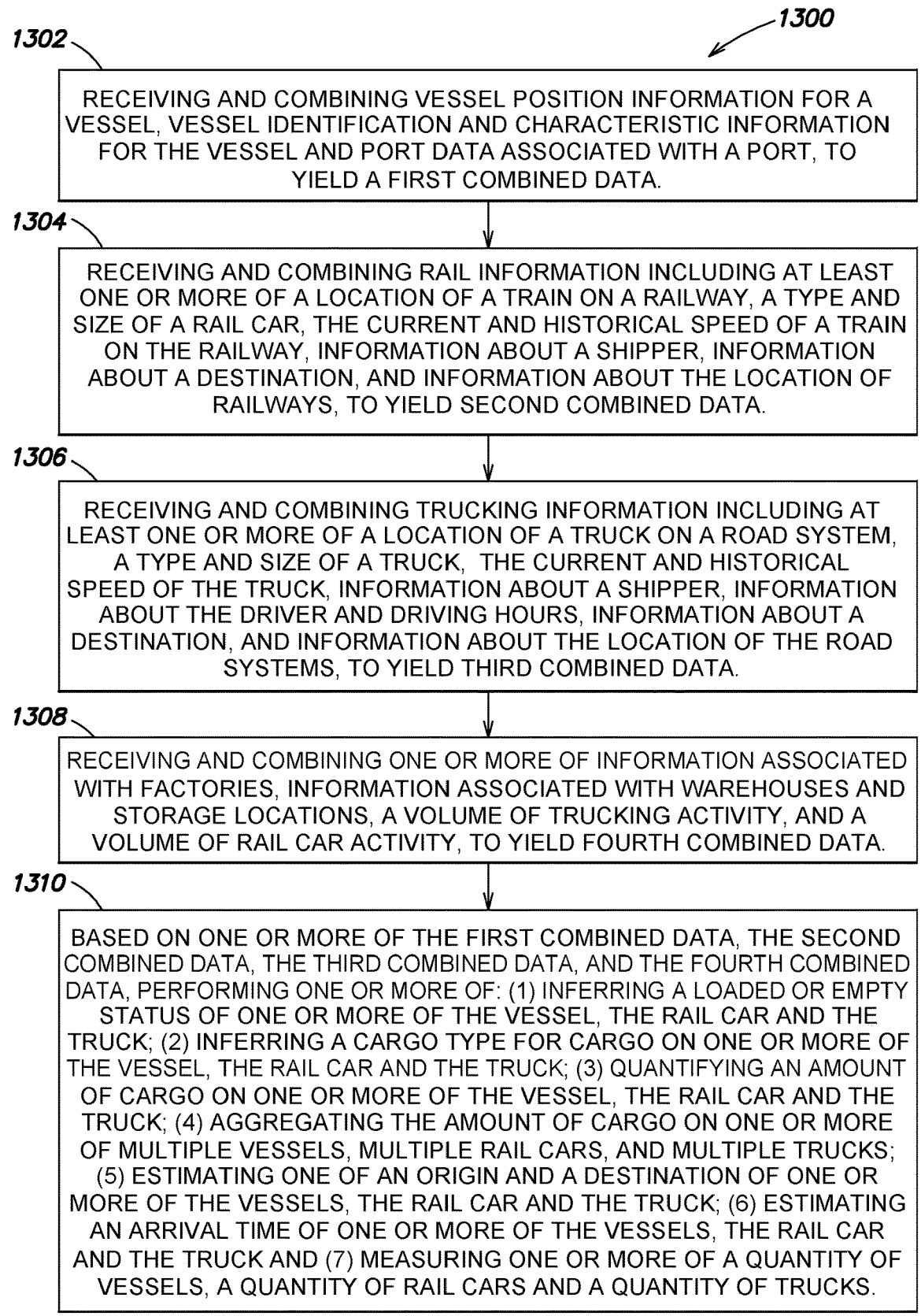
FIG. 13 illustrates another method of inferring a status of a vessel, cargo type, or other data about a number of different types of vessels, such as boats and trucks.

Another aspect relates to the superset concept of managing or inferring shipping data over multiple transportation types. FIG. 13 illustrates this aspect. A method includes receiving and combining, at a server, vessel position information for a vessel, vessel identification and characteristic information for the vessel and port data associated with a port, to yield first combined data (1302). The vessel position information for the vessel is determined from at least one of an automatic identification system (AIS) message (or any other message) from the vessel and an image of the vessel, which can be a picture, infrared, radar or other. The vessel identification and characteristic information for the vessel can include at least one of a vessel type of the vessel, a name of the vessel, a number associated with the vessel, a status of the vessel, a size of the vessel, and a capacity of the vessel. The port data associated with the port can include at least one of an operational status of the port, a position of the port, a capacity of the port, a size of the port, a number and location of berths within a port, draft restrictions at the port, cargos handled by the port, and cargos handled by the berths within the port.

The method further includes receiving and combining, at the server, rail information including at least one of more of a location of a train on a railway, a type and size of a rail car, the current and historical speed of a train on the railway, information about a shipper, information about a destination, and information about the location of railways, to yield second combined data (1304), receiving and combining, at the server, trucking information including at least one of more of a location of a truck on a road system, a type and size of a truck, the current and historical speed of the truck, information about a shipper, information about the driver and driving hours, information about a destination, and information about the location of road systems, to yield third combined data (1306), and receiving and combining one or more of information associated with factories, information associated with warehouses and storage locations, a volume of trucking activity, and a volume of rail car activity, to yield fourth combined data (1308).

The method includes, based on one or more of the first combined data, the second combined data, the third combined data, and the fourth combined data, performing one or more of: (1) inferring a loaded or empty status of one or more of the vessel, the rail car and the truck; (2) inferring a cargo type for cargo on one or more of the vessel, the rail car and the truck; (3) quantifying an amount of cargo on one or more of the vessel, the rail car and the truck; (4) aggregating the amount of cargo on one or more of multiple vessels, multiple rail cars, and multiple trucks; (5) estimating one of an origin and a destination of one or more of the vessel, the rail car and the truck; (6) estimating an arrival time of one or more of the vessel, the rail car and the truck and (7) measuring one or more of a quantity of vessels, a quantity of rail cars and a quantity of trucks (1310).

Figure 14B:
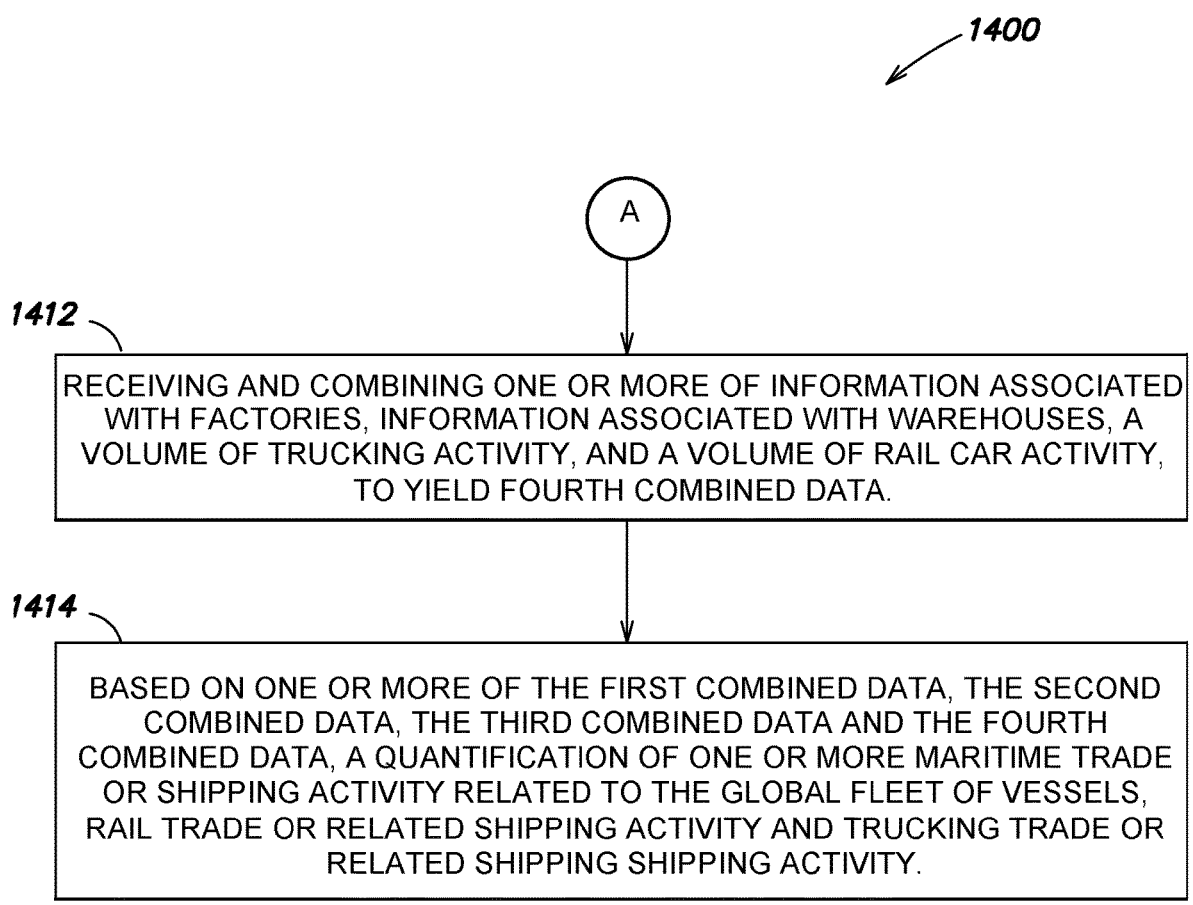
FIG. 14B illustrates another portion of the method embodiment of FIG. 14A.

In yet another aspect, a method, shown in FIG. 14, includes receiving digital vessel location data for a global fleet of vessels, the digital vessel location data being at least one or radar data, image data, AIS-type data, or other data and received at least in part from satellite data, ground based receiver or data transmitted by one or more vessel of the global fleet of vessels (1402), inferring, at a server, a cargo type of cargo in a vessel and a loaded/empty status of the vessel by combining, via a processor, on or more of the digital vessel location data, historical vessel location data, vessel physical characteristics data, port physical characteristics data and known patterns of commodity flows (1404), combining, via a processor, one or more of the digital vessel location data, the historical vessel location data, the vessel physical characteristics data, the port physical characteristics data, the cargo type and the loaded/empty status of the vessel to yield first combined data (1406), receiving and combining, at the server, trucking information including at least one of more of a type of a truck, a location of a truck on a road system, information about a shipper, and information about a destination, to yield second combined data (1408). The method further includes receiving and combining, at the server, rail information including at least one of more of a type of a rail car, a location of a train on a railway, information about a shipper, and information about a destination, to yield third combined data (1410), receiving and combining one or more of information associated with factories, information associated with warehouses, a volume of trucking activity, and a volume of rail car activity, to yield fourth combined data (1412), generating, based on one or more of the first combined data, the second combined data, the third combined data and the fourth combined data, a quantification of one or more of maritime trade or shipping activity related to the global fleet of vessels, rail trade or related shipping activity and trucking trade or related shipping activity (1414).

While the disclosure has been described with reference to illustrative embodiments, it will be understood by those skilled in the art that various other changes, omissions, and/or additions may be made and substantial equivalents may be substituted for elements thereof without departing from the spirit and scope of the disclosure. In addition, many modifications may be made to adapt a particular situation or material to the teaching of the disclosure without departing from the scope thereof. Therefore, it is intended that the disclosure not be limited to the particular embodiment disclosed for carrying out this disclosure, but that the disclosure will include all embodiments, falling within the scope of the appended claims. Any feature(s) of any embodiment or example described above can be combined with any other feature(s) of any other example or embodiment. Moreover, unless specifically stated any use of the terms first, second, etc., do not denote any order of importance, but rather the terms first, second, etc. are used to distinguish one element from another.

We claim:

1. A method comprising:
    receiving, via a computer-generated electronic communication from a location-determining device on a vehicle, vehicle location data for the vehicle;
    receiving, via a processor, incomplete data or inaccurate data associated with one or more of a fleet of vehicles, historical vehicle location data, the vehicle location data, vehicle physical characteristics data, dock physical characteristics data associated with a dock and known patterns of trade flows using the fleet of vehicles;
    applying an algorithm to fill in gaps from the incomplete data or the inaccurate data to yield generated data;
    inferring, based on the generated data, a cargo and a load status data for one or more vehicles in the fleet of vehicles to yield inferred data; and
    generating suggestions for one or more vehicles regarding a route based on one or more of the generated data and the inferred data.

2. The method of claim 1, wherein receiving the vehicle location data is performed via an antenna or satellite.

3. The method of claim 1, further comprising:
    predicting, based on location data and inferred data for multiple vehicles, global trade at one of an individual vehicle level and an aggregated fleet of vehicles level.

4. The method of claim 1, wherein the vehicle comprises a vehicle with wheels, a flying vehicle or a boat.

5. The method of claim 1, further comprising:
    receiving data regarding one or more of a supply, a demand, and an amount of available cargo to yield combined data.

6. The method of claim 5, wherein generating the suggestions for one or more vehicles regarding the route is further based on the combined data.

7. The method of claim 1, wherein a loaded/empty status of the vehicle is inferred based on the incomplete data or the inaccurate data.

8. The method of claim 1, wherein the incomplete data or the inaccurate data comprises one or more of location-based data, image data or radar data retrieved at least in part from one or more of a satellite, a ground based receiver, from a respective vehicle of the fleet of vehicles, or other receiver.

9. The method of claim 8, further comprising inferring a loaded/empty status of a plurality of vehicles.

10. The method of claim 1, wherein the incomplete data or the inaccurate data comprises two or more of global-positioning-system data, image data or radar data.

11. The method of claim 1, wherein the incomplete data or the inaccurate data comprises a combination of two or more of the historical vehicle location data, the vehicle location data, the vehicle physical characteristics data, the dock physical characteristics data, a speed of vehicles of the fleet of vehicles, vehicle congestion data, and the known patterns of trade flows.

12. The method of claim 1, wherein the dock physical characteristics data comprise one or more of an operational status of the dock, a position of the dock, a capacity of the dock, a size of the dock, stations configured at the dock, a location of the stations configured at the dock, cargo handled by the dock, and cargo handled at respective stations within the dock.

13. The method of claim 1, wherein the incomplete data or the inaccurate data comprises radar data related to an image of the vehicle.

14. A system comprising:
    a processor;
    an antenna; and
    a computer readable storage medium storing instructions which, when executed by the processor, cause the processor to perform operations comprising:
        receiving, via a computer-generated electronic communication from a location-determining device on a vehicle, vehicle location data for the vehicle;
        receiving incomplete data or inaccurate data associated with one or more of a fleet of vehicles, historical vehicle location data, the vehicle location data, vehicle physical characteristics data, dock physical characteristics data associated with a dock and known patterns of trade flows using the fleet of vehicles;
        applying an algorithm to fill in gaps from the incomplete data or the inaccurate data to yield generated data;
        inferring, based on the generated data, a cargo and a load status data for one or more vehicles in the fleet of vehicles to yield inferred data; and
        generating suggestions for one or more vehicles regarding a route based on one or more of the generated data and the inferred data.

15. The system of claim 14, wherein the computer readable storage medium stores additional instructions which, when executed by the processor, cause the processor to perform operations comprising:
    predicting, based on location data and inferred data for multiple vehicles, global trade at one of an individual vehicle level and an aggregated fleet of vehicles level.

16. The system of claim 14, wherein the vehicle comprises a vehicle with wheels, a flying vehicle or a boat.

17. The system of claim 14, wherein the computer readable storage medium stores additional instructions which, when executed by the processor, cause the processor to perform operations comprising:
    receiving data regarding one or more of a supply, a demand, and an amount of available cargo to yield combined data.

18. The system of claim 17, wherein generating the suggestions for one or more vehicles regarding the route is further based on the combined data.

19. The system of claim 14, wherein a loaded/empty status of the vehicle is inferred based on the incomplete data or the inaccurate data.

20. The system of claim 14, wherein the computer readable storage medium stores additional instructions which, when executed by the processor, cause the processor to perform operations comprising: wherein the incomplete data or the inaccurate data comprises one or more of location-based data, image data or radar data retrieved at least in part from one or more of a satellite, a ground based receiver, from a respective vehicle of the fleet of vehicles, or other receiver.

* * * * *